United States Patent [19]
Ohkawa et al.

[11] Patent Number: 4,891,399
[45] Date of Patent: Jan. 2, 1990

[54] THERMOPLASTIC RESIN-BASED MOLDING COMPOSITION

[75] Inventors: Hideo Ohkawa, Higashimatsuyama; Masakuni Chikushi; Hironori Nakamura, both of Fujimi; Shinji Funayama, Higashimatsuyama; Takashi Hashimoto; Takahiro Hirai, both of Fujimi, all of Japan

[73] Assignee: CALP Corporation, Tokyo, Japan

[21] Appl. No.: 110,129

[22] Filed: Oct. 19, 1987

[30] Foreign Application Priority Data

Oct. 28, 1986 [JP] Japan .................................. 61-254680
Jun. 23, 1987 [JP] Japan .................................. 62-156296
Jun. 26, 1987 [JP] Japan .................................. 62-159356
Jul. 3, 1987 [JP] Japan .................................. 62-166464

[51] Int. Cl.$^4$ ............................ C08K 3/22; C08K 9/06
[52] U.S. Cl. ...................................... 523/200; 523/212; 523/213; 524/430; 524/440
[58] Field of Search ............... 523/203, 212, 213, 200; 524/275, 430, 440

[56] References Cited

U.S. PATENT DOCUMENTS

| | | | |
|---|---|---|---|
| 4,089,838 | 5/1978 | Hornbaker et al. | 523/212 |
| 4,096,110 | 6/1978 | Monte et al. | 523/200 |
| 4,122,062 | 10/1978 | Monte et al. | 523/200 |
| 4,357,271 | 11/1982 | Rosenquist | 523/212 |
| 4,370,436 | 1/1983 | Nakamura et al. | 524/439 |
| 4,623,738 | 11/1986 | Sugerman et al. | 523/200 |
| 4,690,959 | 9/1987 | Plueddemann | 523/213 |
| 4,713,408 | 12/1987 | Takahashi et al. | 524/605 |

FOREIGN PATENT DOCUMENTS 53-31747 3/1978 Japan .
55-120637 9/1980 Japan .

OTHER PUBLICATIONS

Katz et al.; Handbook of Fillers and Reinforcements for plastics; 1978; p. 192.

Primary Examiner—Lewis T. Jacobs
Attorney, Agent, or Firm—Frishauf, Holtz, Goodman & Woodward

[57] ABSTRACT

The thermoplastic polymeric molding composition of the invention has good moldability in shaping by injection molding, extrusion molding and compression molding and capable of giving shaped articles having good machinability in mechanical working such as cutting, grinding and latching. The composition is compounded from 2 to 70 parts by weight of a thermoplastic polymer such as a polyamide resin and from 98 to 30 parts by weight of a metallic filler such as zinc powder and zinc oxide powder having a surface coated with a water repellent agent such as silane coupling agents, titanate coupling agents and silicone fluids in a specified amount. A part of the above mentioned particulate filler may optionally be replaced with a fibrous filler such as glass fibers and carbon fibers so that the shaped articles of the molding composition may be imparted with increased impact strength.

25 Claims, No Drawings

THERMOPLASTIC RESIN-BASED MOLDING COMPOSITION

BACKGROUND OF THE INVENTION

The present invention relates to a thermoplastic resin-based molding composition or, more particularly, to a molding composition based on a thermoplastic resin as the matrix compound with a specific filler and suitable for molding various shaped articles used in a wide variety of applications including, for example, structural parts in electric and electronic instruments, industrial machines and transportation machines such as automobiles as well as furnitures and other household commodities.

As is well known, thermoplastic resins have advantages over metallic materials in respect of their good workability, excellent corrosion resistance, lightness in weight and inexpensiveness so that they are useful as a base material for the manufacture of various shaped articles such as structural parts of instruments and machines as well as furnitures and other household commodities.

Thermoplastic resins in general, however are inferior in the mechanical properties such as tensile strength, impact strength and hardness in comparison with metallic materials and are not quite satisfactory in respect of the heat resistance and dimensional stability. Moreover, the usually advantageous feature of lightness in weight may in some cases cause a disadvantage to give a trifling impression as commercial goods.

A proposal has been made to solve the above described problems by compounding a thermoplastic resin with a metallic filler. For example, thermoplastic resins such as polypropylene, polyethylene, polyamide, poly(ethylene terephthalate), poly(butylene terephthalate) and the like are compounded with a fine powder of a metal such as zinc, copper, iron and the like as a filler to give a resin-based composite molding compound.

Shaped articles prepared from such a metal-filled molding compound, however, more or less have an unavoidable serious problem of rusting of the metal particles contained in the shaped article to cause poor appearance or degradation in the mechanical properties when the article is prolongedly kept in humid air, water, soil or other corrosive environment. When rusting occurs in the molding compound before molding, which is usually in the form of pellets, moreover, drawbacks are sometimes caused in the molding work of such a deteriorated molding compound.

Several methods have been proposed to solve this problem including a method of forming a corrosion-resistant coating layer of, for example, a rust inhibitor, metal plating and ceramic on the surface of the shaped article, a method of forming a relatively thick uniform skin layer of a rust-free resin on the surface of the shaped article and a method of wrapping the shaped article with a film of a plastic resin having a small permeability to moisture.

These methods, however, cannot provide a complete solution of the problem. For example, the corrosion-resistant coating layer formed on the surface of a shaped article has a problem of inherently low durability because the coating layer gradually falls off the surface with time. In addition, the productivity of shaped articles must decrease because the process is complicated for forming such a protective surface layer. The method of forming a skin layer is particularly defective when the shaped article has an irregular configuration or non-uniform wall thickness due to the extreme difficulty in obtaining a skin layer of uniform thickness. The productivity of course cannot be high enough. The method of wrapping with a plastic film also suffers low productivity due to the complicated and troublesome process if not to mention the limited applicability of the method.

In addition to the above described problem due to rusting of metal particles, conventional metallic filler-loaded composite molding compounds have problems in the moldability of the compound and stability of the shaped articles therefrom, especially, when the molding compound has a density in excess of 1.5 g/cm$^3$ or, in particular, 2.0 g/cm$^3$. The moldability of such a molding compound is poor so that the appearance of the articles shaped therefrom is sometimes not quite acceptable. Moreover, the shaped articles of such a molding compound usually have relatively low mechanical strengths or, in particular, impact strength and exhibit a large molding shrinkage sometimes with different ratios of shrinkage between directions. Therefore, it is a rather difficult matter to obtain a satisfactory shaped article of high density with good dimensional stability exhibiting no warping distortion from such a metallic filler-loaded molding compound.

Further, degradation of the matrix resin may sometimes take place in such a metallic filler-loaded composite molding compound due to the influence of the metal particles. The molding compound is also not quite satisfactory as a moldable electroconductive material because sufficiently high electroconductivity can hardly be obtained or the reproducibility of the conductivity, if obtained, is usually low.

SUMMARY OF THE INVENTION

An object of the present invention therefore is to provide a novel thermoplastic resin-based molding composition loaded with a metallic filler free from the above described problems and disadvantages in the conventional metallic filler-loaded molding compounds. Namely, the molding composition of the present invention should have good moldability and be capable of giving shaped articles having good appearance and high mechanical properties as well as dimensional stability, electroconductivity and resistance against rusting and also suitable for secondary machining such as cutting, grinding and lathing using standard machine tools.

As a result of the extensive investigations undertaken with the above mentioned object, it has been unexpectedly discovered that the problems can be solved by compounding a thermoplastic resin with a specific amount of a metallic filler after a surface treatment of the particles with a specific amount of a compound belonging to the class of so-called water repellent agents, optionally, with further admixture of a small amount of a low-molecular weight oxidized polypropylene.

Thus, the thermoplastic resin-based molding composition of the present invention comprises:

(A) from 2 to 70 parts by weight of a thermoplastic polymer as the matrix phase; and (B) from 98 to 30 parts by weight of a metallic filler, of which the particles have a surface coated with a water repellent agent, the amount of the water repellent agent being in the range from 0.01 to 5% or, preferably, from 0.3 to 3% by weight by weight based on the metallic filler before coating therewith.

When the molding composition is additionally admixed with (C) a low-molecular weight oxidized polypropylene, the composition comprises:

(A) from 2 to 70 parts by weight of a thermoplastic polymer;

(B) from 98 to 30 parts by weight of a metallic filler, of which the particles have a surface coated with a water repellent agent, the amount of the water repellent agent being as mentioned above; and (C) a low-molecular weight oxidized polypropylene in an amount in the range from 0.1 to 2% by weight based on the total amount of the components (A) and (B).

Although the above mentioned metallic filler is usually in a particular form, it is sometimes advantageous that a part of such a particulate filler is replaced with a fibrous filler. Namely, the metallic filler as the component (B) in the above given formulations should be a combination of a particulate metallic filler having an average particle diameter, for example, in the range from 0.1 to 20 μm and a fibrous metallic filler having a fiber diameter in the range from 0.03 to 60 μm or, preferably, from 0.1~20 μm and an aspect ratio in the range from 50 to 2500 in a weight ratio not exceeding 1:1 or, preferably, in the range from 1:1 to 30:1.

DETAILED DESCRIPTION OF THE PREFERRED EMBODIMENTS

The component (A) to form the matrix phase of the inventive molding composition is a thermoplastic polymer which is not limited to a particular type but may be selected from various kinds of thermoplastic resins and elastomers either singly or as a combination of two kinds or more according to need.

The above mentioned thermoplastic resins include polyolefin resins, poly(vinyl chloride) resins, polyamide resins, polyimide resins, polyester resins, polyacetal resins, polycarbonate resins, poly(aromatic ether or thioether) resins, poly(aromatic ester) resins, polysulfone resins, polystyrene resins, acrylic resins, fluorocarbon resins and the like.

The polyolefin resins include homopolymers and copolymers of α-olefins such as ethylene, propylene, butene-1, 1-methyl-butene-1, 3-methylpentene-1, 4-methylpentene-1 and the like as well as copolymers of these monomers as the principal ingredient with another monomer of a different type. Typical examples of the polyolefin resins are high-density, medium-density and low-density polyethylenes, straight-chained polyethylenes, super-high molecular polyethylenes, copolymers of ethylene and vinyl acetate and other ethylene-based polymers, atactic, syndiotactic and isotactic polypropylenes, block and random copolymers of propylene and ethylene and other propylene-based polymers, poly(4-methylpentene-1) and the like.

Further, these polyolefins may be modified by the graft polymerization of a polar vinylic monomer such as α, β-unsaturated carboxylic acids and esters thereof exemplified by acrylic acid, esters of acrylic acid, methacrylic acid, esters of methacrylic acid, maleic acid, fumaric acid, citraconic acid, itaconic acid, crotonic acid and the like or an unsaturated epoxide exemplified by glycidyl acrylate, glycidyl methacrylate, vinyl glycidyl ether, allyl glycidyl ether and the like.

The poly(vinyl chloride) resins include homopolymeric poly(vinyl chloride) resins and copolymeric resins of vinyl chloride with another monomer copolymerizable therewith. The copolymeric resins are exemplified by the copolymers of vinyl chloride and an acrylic acid ester, copolymers of vinyl chloride and a methacrylic acid ester, copolymers of vinyl chloride and ethylene, copolymers of vinyl chloride and propylene, copolymers of vinyl chloride and vinyl acetate, copolymers of vinyl chloride and vinylidene chloride and the like. These poly(vinyl chloride) resins may be post-chlorinated to have an increased content of chlorine.

The polyamide resins include 6-nylon, 12-nylon and the like obtained by the ring-opening polymerization of an aliphatic cyclic lactam, 6,6-nylon, 6,10-nylon, 6,12-nylon and the like obtained by the condensation-polymerization of an aliphatic diamine and an aliphatic dicarboxylic acid, condensation-polymerization of m-xylene and adipic acid and the like obtained by the condensation-polymerization of an aromatic diamine and an aliphatic dicarboxylic acid, condensation-polymerizates of p-phenylene diamine and terephthalic acid or m-phenylene diamine and isophthalic acid and the like obtained by the condensation-polymerization of an aromatic diamine and an aromatic dicarboxylic acid, 11-nylon and the like obtained by the condensation-polymerization of an amino acid, and so on.

The polyimide resins include polyimides and polyamideimides. Exemplary of the polyimides are these obtained from the combinations of pyromellitic anhydride and diamino diphenyl ether, 3,4,3',4'-benzophenone tetracarboxylic acid anhydride and diamino diphenyl ether, bismaleimide and diamino diphenyl methane and the like. Exemplary of the polyamideimides are those obtained from the combination of trimellitic anhydride and diamino diphenyl ether and the like.

The polyester resins include those obtained by the condensation-polymerization of an aromatic dicarboxylic acid and an alkylene glycol exemplified by poly (ethylene terephthalates), poly (methylene terephthalates) and the like.

The polyacetal resins are exemplified by the homopolymeric polyoxymethylenes and copolymers of formaldehyde and ethylene oxide obtained from trioxane and ethylene oxide.

Preferable examples of the polycarbonate resins are the 4,4'-dihydroxy diallyl alkane-based polycarbonates and the bisphenol A-based polycarbonates prepared by the phosgene method, in which bisphenol A and phosgene A and phosgene are reacted, or the ester interchange method, in which bisphenol A and a diester of carbonic acid such as diphenyl carbonate are reacted. Usable polycarbonate resins include those modified or flame-retardant bisphenol A-based polycarbonates obtained by partially replacing the bisphenol A in the above mentioned preparation of unmodified polycarbonates with 2,2-bis (4-hydroxy-3,5-dimethyl phenyl) propane, 2,2-bis (4-hydroxy-3,5-dibromo phenyl) propane and the like.

The poly(aromatic ether or thioether) resins have ether linkages or thioether linkages in the polymeric molecular chain and are exemplified by polyphenylene oxides, styrene-grafted polyphenylene oxides, polyphenylene sulfides and the like.

The poly(aromatic ester) resins are exemplified by polyoxybenzoyls obtained by the condensation-polymerization of 4-hydroxy benzoic acid and polyarylates obtained by the condensation-polymerization of bisphenol A and an aromatic dicarboxylic acid such as terephthalic acid and isophthalic acid.

The polysulfone resins have sulfone linkages in the polymeric molecular chain and are exemplified by polysulfones obtained by the condensation-polymerization of bisphenol A 4,4'-dichlorodiphenyl sulfone, polyether sulfones having a structure in which phenylene groups are bonded together at the 1,4-positions through ether linkages and sulfone linkages and polyaryl sulfones having a structure in which diphenylene groups and diphenylene ether groups are alternately bonded together through sulfone linkages.

The polystyrene resins include homopolymers of styrene and α-methyl styrene and copolymers thereof as well as copolymers of them as the principal ingredient with another monomer copolymerizable therewith. Typical examples of the polystyrene resins are general-purpose polystyrenes, high-impact polystyrenes, heat-resistant polystyrenes, polymers of α-methyl styrene, copolymers of acrylonitrile, butadiene and styrene (ABS), copolymers of acrylonitrile and styrene (AS), copolymers of acrylonitrile, chlorinated polyethylene and styrene (ACS), copolymers of acrylonitrile, ethylenepropylene rubber and styrene (AES), copolymers of acrylic rubber, acrylonitrile and styrene and the like.

The acrylic resins include polymers of acrylic acid esters and methacrylic acid esters exemplified by methyl, ethyl, n-propyl, isopropyl and butyl esters of acrylic acid and methacrylic acid. Particularly preferable among them are poly(methyl methacrylate) resins from the standpoint of practically using the inventive molding composition as an industrial material.

The fluorocarbon resins include homopolymers of tetrafluoro ethylene, hexafluoro propylene, vinylidene fluoride, vinyl fluoride and the like and copolymers thereof as well as copolymers of these fluorinated monomers as the principal ingredient with another monomer copolymerizable therewith. Exemplary of the fluorocarbon resin are poly(tetrafluoroethylenes), poly(vinylidene fluorides), poly(vinyl fluorides), copolymers of tetrafluoroethylene and ethylene, copolymers of tetrafluoroethylene and vinylidene fluoride, copolymers of hexafluoropropylene and vinylidene fluoride, copolymers of tetrafluoroethylene, hexafluoropropylene and vinylidene fluoride and the like.

The elastomeric polymers suitable as the component (A) include natural rubber and various kinds of synthetic rubbers exemplified by polybutadiene rubbers (BR), copolymeric rubbers of styrene and butadiene (SBR), copolymeric rubbers of acrylonitrile and butadiene (NBR), copolymeric rubbers of styrene, butadiene and acrylonitrile, polychloroprene rubbers (CR) and other butadiene-based rubbers, polyisoprene rubbers or synthetic natural rubbers, copolymeric rubbers of isobutylene and isoprene or so-called butyl rubbers (IIR), copolymeric rubbers of acrylonitrile and isoprene, polyisobutylene rubbers, copolymeric rubbers of ethylene and propylene, copolymeric rubbers of ethylene and vinyl acetate, chlorinated polyethylenes, chlorosulfonated polyethylenes, urethane rubbers, silicone rubbers, fluorocarbon rubbers, acrylic rubbers, epichlorohydrin rubbers, propylene oxide rubbers, polyester-based elastomers, polyacrylate-based elastomers, polyolefin-based elastomers, poly-(vinyl chloride)-based elastomers, copolymeric elastomers of styrene and butadiene, polystyrene-based elastomers, polyamide-based elastomers, polyurethane-based elastomers and the like.

The above named polymers can be used either singly or as a mixture of two kinds or more according to need as the component (A) to form the matrix phase of the inventive molding composition. Particularly preferable among them are polyamide resins such as 6-nylon, 6,6-nylon, 12-nylon and the like, polypropylenes and poly(butylene terephthalates).

The components (B) to form the disperse phase in the inventive molding composition is a metallic filler usually in a particulate form. Metals of which the powder as the metallic filler is prepared include zinc, copper, iron, lead, aluminum, nickel, chromium, titanium, manganese, tin, platinum, tungsten, gold, magnesium, cobalt, strontium and the like as well as alloys of these metallic elements such as stainless steel, solder alloys, brass, bronze and the like, of which zinc is particularly preferred. Zinc oxide also can be used. Certain ceramic materials obtained in a powdery form can be used as the filler including silicon carbide, silicon nitride, zirconia, aluminum nitride, titanium carbide and the like.

The metallic filler in a particulate form as the component (B) should have an average particle diameter in the range from 0.2 to 2.0 $\mu$m or, preferably, in the range from 0.4 to 10 $\mu$m. When the filler particles are too fine, the molding composition compounded with the filler may be poor in the moldability. When the filler particles are too coarse, on the other hand, the molding composition compounded with the filler cannot give a shaped article having a sufficiently high impact strength and free from the drawbacks of warping distortion after molding.

When a particular high impact strength is desired of the shaped article of the inventive molding composition, it is advantageous to replace a part of the above described filler in a particulate form with a fibrous filler. Suitable fibrous fillers include inorganic fibers such as glass fibers, carbon fibers, magnesium sulfate fibers and the like, fibers and whiskers of a metal such as stainless steel, brass, aluminum, nickel and the like, whiskers of ceramics such as potassium titanate, silicon carbide and the like, and organic fibers such as aromatic polyamide fibers, cellulosic fibers, nylon fibers, polyester fibers, polypropylene fibers and the like. Preferable among them are glass fibers, carbon fibers, stainless steel fibers, brass fibers, potassium titanate whiskers, aromatic polyamide fibers and the like. Glass fibers are particularly preferred. These fibrous fibers can be used either singly or as a combination of two kinds or more accordingly to need.

The fibers of the fibrous filler should have a fiber diameter in the range from 0.03 to 60 $\mu$m or, preferably, from 0.1~20 $\mu$m and an aspect ratio in the range from 50 to 2500 or, preferably, from 100 to 2000. When the aspect ratio of the fibers is to small, desired improvement in the impact strength of the shaped article cannot be achieved as desired. When the aspect ratio of the fibers is too large, on the other hand, the shaped articles of the molding composition may be subject to an increased molding shrinkage and drawbacks of warping distortion after molding so that the molding composition cannot be used industrially due to the poor dimensional stability of the shaped articles therefrom.

When a particulate filler and a fibrous filler are used in combination as the component (B) in the inventive molding composition, the weight ratio of them should not exceed 1:1 although no substantial improvement can be obtained in the impact strength of the shaped articles molded of the composition when the amount of the fibrous filler is too small. In this regard, the weight ratio of the particulate to fibrous fillers should be in the range from 1:1 to 30:1 or, preferably, from 2:1 to 20:1.

When the inventive molding composition is prepared by compounding the thermoplastic polymer as the component (A) with the filler as the component (B), it is essential that the filler is subjected in advance to a surface treatment with a water repellent agent in a specific amount. Suitable water repellent agents include silane-based coupling agents, titanate-based coupling agents, silicone fluids, higher fatty acids, higher alcohols, waxes and the like, of which silane-based coupling agents, titanate-based coupling agents and silicone fluids are preferred. These water repellent agents can be used either singly or as a combination of two kinds or more according to need.

The type of the above mentioned silane-based coupling agent is not particularly limitative, and any of known ones can be used. Exemplary of suitable silane-based coupling agents are triethoxy silane, vinyl tris ($\beta$-methoxyethoxy) silane, 3-methacryloxypropyl trimethoxy silane, 3-glycdyloxypropyl trimethoxy silane, 2-(3,4-epoxycyclohexyl)ethyl trimethoxy silane, N-(2-aminoethyl)-3-aminopropyl methyl dimethoxy silane, N-(2-aminoethyl)-3-aminopropyl methyl dimethoxy silane, 3-aminopropyl triethoxy silane, N-phenyl-3-aminopropyl trimethoxy silane, 3-mercaptopropyl trimethoxy silane, 3-chloropropyl trimethoxy silane and the like, of which 3-aminopropyl triethoxy silane and N-(2-aminoethyl)-3-aminopropyl trimethoxy silane are preferred.

The type of the above mentioned titanate-based coupling agents is also not particularly limitative and any of hitherto known ones can be used. Exemplary of suitable titanate-based coupling agents are isopropyl triisostearoyl titanate, isopropyl tri(dodecylbenzene sulfonyl) titanate, isopropyl tris(dioctyl pyrophosphato) titanate, tetraisopropyl bis(dioctylphosphito) titanate, tetraoctyl bis(ditridecyl phosphito) titanate, tetra(2,2-diallyloxy methyl-1-butyl) bis(di-tridecyl phosphito) titanate, bis(-dioctyl pyrophosphato) oxyacetate titanate bis(dioctyl pyrophosphato) ethylene titanate, isopropyl trioctanoyl titanate, isopropyl dimethacryl isostearoyl titanate, isopropyl tri(dioctyl phosphato) titanate, isopropyl, tri(cumyl phenyl) titanate, isopropyl tri(N-amidoethyl aminoethyl) titanate, dicumyl phenyl oxyacetate titanate, di(isostearoyl) ethylene titanate and the like, of which isopropyl triisostearoyl titanate and isopropyl tri(N-amidoethyl amioethyl) titanate are preferred.

Further, suitable silicone fluids include dimethyl silicone fluids, methyl phenyl silicone fluids, polyether-modified silicone fluids, alkyl-modified silicone fluids, methyl hydrogen polysiloxane fluids and the like, of which dimethyl silicone fluids and methyl hydrogen polysiloxane fluids are preferred.

To summarize the description on the types of the water repellent agents, dimethyl silicone fluids, methyl hydrogen polysiloxane fluids and 3-aminopropyl triethoxy silane are particularly preferable as the surface treatment agent of the filler as the component (B) in the inventive molding composition.

The procedure for the surface treatment of the component (B) with the water repellent agent is not particularly limitative according to any known method conventionally undertaken for the surface treatment of a powdery material. A preferable method in respect of the versatility and controllability of the temperature and mixing velocity in the treatment is to use a Henschel mixer in which the water repellent agent is sprayed on to the filler under agitation and thoroughly mixed together.

The water repellent agent in this surface treatment of the filler as the component (B) should be used in an amount in the range from 0.01 to 5% by weight or, preferably, from 0.05 to 3% by weight or, more preferably, from 0.1 to 2% by weight based on the amount of the filler as the component (B) before the surface treatment. When the amount of the water repellent agent is too small, no sufficient coupling effect can be exhibited between the surface of the filler and the matrix phase so that the resultant molding composition would be poor in the moldability. When the amount thereof is too large, on the other hand, a phenomenon of slipping may be caused due to the excessively strong effect of lubrication between the filler surface and the matrix phase leading to disadvantages of decreased productivity of pelletization of the molding composition and decreased workability in the molding works along with a problem of poor appearance of the shaped articles prepared from the composition as a result of strong bleeding of the water repellent agent on the surface of the shaped article.

The fillers thus surface-treated or coated with the water repellent agent as the component (B) can be used either singly or as a combination of two kinds or more according to need. The compounding amount of the component (B) in the inventive molding composition should be in the range from 30 to 98 parts by weight or, preferably, from 50 to 97 parts by weight or, more preferably, from 60 to 95 parts by weight per 100 parts by weight of the total amount of the components (A) and (B).

As is mentioned before, the inventive molding composition can be further admixed with a low-molecular weight oxidized polypropylene as the component (C) in an amount in the range from 0.1 to 2% by weight based on the total amount of the polymeric matrix phase as the component (A) and the filler after the surface treatment as the component (B). The low-molecular weight oxidized polypropylene is prepared by the oxidative degradation of, for example, an isotactic polypropylene as a solid or melt or in the form of a solution with an oxidizing agent such as peroxides. Carboxyl groups and other types of oxygen-containing groups are introduced into the molecular structure of the polypropylene by this oxidizing reaction. By virtue of the carboxyl groups introduced into the molecular structure, the low-molecular weight oxidized polypropylene has increased miscibility with thermoplastic resins having polarity such as polyamides in comparison with non-oxidized low-molecular weight polypropylenes. It is preferable to use a low-molecular weight oxidized polypropylene having an average molecular weight in the range from 1500 to 20000. When admixed with an appropriate amount of such a low-molecular weight oxidized polypropylene, the molding composition is imparted with improved moldability and capable of giving shaped articles having improved mechanical strengths and electric conductivity.

When improvements in the mechanical properties and dimensional stability of shaped articles of the composition are desired, it is sometimes advantageous to admix the composition with a modifier such as a modified polyolefin which serves to increase the affinity between the polymeric matrix as the component (A) and the surface of the filler as the component (B). Suitable polyolefin-based modifiers include, for example, polyethylene and polypropylene modified by graft-polymerization of 0.05 to 20% by weight of a monomer exemplified by unsaturated organic acids and derivatives thereof such as acrylic acid, methacrylic acid, maleic acid, itaconic acid and other organic acids, maleic anhydride, itaconic anhydride, citraconic anhydride and other anhydrides of unsaturated organic acids, methyl acrylate, monomethyl maleate and other esters of unsaturated organic acids, acrylamide, fumaric acid monoamide and other amides of unsaturated organic acids, itaconic acid imide and other imides of unsaturated organic acids, and so on. The modification reaction of the polyolefin by the polymerization of these monomers can be accelerated by an organic peroxide such as benzoyl peroxide, lauroyl peroxide, dicumyl peroxide, tert-butyl hydroperoxide and the like.

Usable modifiers in addition to the above described ones include ethylene- or propylene-based polymers modified by graft polymerization of an unsaturated epoxide such as glycidyl acrylate, glycidyl methacrylate, vinyl glycidyl ether, ally glycidyl ether and the like carried out optionally with admixture of a liquid rubber such as a polybutadiene hydroxylated at the molecular chain ends.

The amount of these modifiers added to the inventive molding composition should usually be in the range from 1 to 10% by weight based on the total amount of the components (A) and (B). When the amount thereof is too small, the desired improvement by the addition of the modifier cannot be fully exhibited as a matter of course. When the amount thereof is too large, on the other hand, phase separation may sometimes take place in the shaped article of the composition to greatly decrease the mechanical strengths.

It is optional according to need that the molding composition of the invention is further admixed with various kinds of inorganic and organic fillers though in a limited amount not to substantially affect the desirable properties of the composition or the shaped article prepared therefrom. Such an optional filler may be powdery, granular or fibrous.

Inorganic fillers suitable for the above mentioned optional addition are exemplified by oxides such as silica, diatomaceous earth, barium ferrite, beryllium oxide, pumice, pumice ballons and the like, hydroxides such as aluminum hydroxide, magnesium hydroxide, basic magnesium carbonate and the like, carbonates such as calcium carbonate, magnesium carbonate, dolomite, dawsonite and the like, sulfates and sulfites such as calcium sulfate, barium sulfate, ammonium sulfate, calcium sulfite and the like, silicates such as talc, clay, mica, asbestos, glass ballons, glass beads, montmorillonite, bentonite and the like, carbonaceous filler such as carbon black, graphite powder, carbon ballons and the like, molybdenum sulfide, zinc borate, barium metaborate, calcium borate, sodium borate and the like. These inorganic filler can be used either singly or as a combination of two kinds or more according to need.

Organic fillers suitable for the above mentioned optional addition are exemplified by non-fibrous ones such as rice hulls, wood flour, fragments of paper and cellophane and the like. These organic filler also can be used either singly or as a combination of two kinds or more according to need. It is of course optional that inorganic and organic fillers are used in combination.

If desired, the molding composition of the invention can be admixed with various kinds of additives conventionally compounded in resin-based molding compositions including, for example, lubricants, coloring agents, stabilizers, antioxidants, ultraviolet absorbers, antistatic agents, flame retardant agents, plasticizers, blowing agents and the like according to the intended application of the articles shaped from the molding composition.

The molding composition of the present invention can be prepared by uniformly blending and compounding the components (A) and (B), optionally, together with the component (C) and above described optional additives in a conventional procedure of kneading in a molten condition by using a suitable blending machine such as Henschel mixers, single-or double-screw extruder machines, Banbury mixers, roller mixers and the like, of which Henschel mixers, extruder machines and Bunbury mixers are preferred.

The molding composition of the present invention can be shaped into articles by any conventional molding method such as injection molding, extrusion molding, compression molding and the like without particular limitations by virtue of the good moldability. The composition can give not only shaped articles having complicated configuration as molded but also shaped articles suitable for secondary work-ing to meet various applications by adequately modifying the blending ratio of the components. The application fields of the shaped articles of the inventive molding composition include structural and functional parts in electric and electronic instruments, machines in general, automobiles and the like, furnitures, household commodities and so on. Particularly exemplary of the shaped articles are, for example, all kinds of rotary members for power transmission such as flywheels, gears, pulleys, cams, motors and the like, housing, chassis, turn tables and the like of record players, cassette tape recorders, speaker boxers, etc., sound insulating and shielding materials, vibra-tion dumping materials, shielding materials for electro-magnetic waves, furnitures, kitchenwares, office supplies, toys, fishing implements and so on.

The thermoplastic resin-based molding composition of the present invention is prepared by compounding a thermoplastic polymer as the matrix phase with a metallic filler after a surface treatment with a water repellent agent so that the filler particles dispersed in the polymeric matrix are highly resistant against rusting along with greatly improved affinity between the surface of the filler particles and the matrix polymer. Accordingly, the inventive molding composition has good moldability and is capable of giving shaped articles having outstandingly good outer appearance, excellent mechanical properties, high dimensional stability without warping distortion and stable electric conductivity. By virtue of the improved moldability, the inventive molding composition can be shaped into articles having large dimensions or a complicated configuration and the shaped articles have good secondary workability suitable for machining with standard machine tools such as cutting, grinding, lathing and the like. Thus, present invention provides a material having excellent moldability into shaped articles and machinability of the shaped articles in combination. Such a combination of moldability and machinability is the very great advantage of the inventive molding composition never obtained in any of conventional resin-based molding composition and metals.

In the following, examples are given to illustrate the inventive molding compositions in more detail but not to limit the scope of the invention in any way.

In the examples given below, the polymeric materials used as the polymeric matrix of the molding compositions include the commercially available products listed below, each of which is referred to hereinbelow with the abridged symbols of the name preceding the name of the polymeric material.

(1) 6-PA: 6-nylon, LM-102, a product by Kanegafuchi Chemical Industry Co.

(2) 66-PA: 6,6-nylon, 1200S, a product by Asahi Chemical Industry Co.

(3) 12-PA: 12-nylon, 3014U, a product by Ube Kosan Co.

(4) MXDA: Polyamide, 6002, a product by Mitsubishi Gas Chemical Co.

(5) PP: polypropylene, J2000G, a product by Idemitsu Petro-chemical Co.

(6) PBT: poly(butylene terephthalate), 5010, a product by Mitsubishi Chemical Industries Co.

(7) PET: poly(ethylene terephthalate), MA 2101, a product by Unitika Co.

(8) POM: polyacetal, 3010, a product by Asahi Chemical Industry Co.

(9) polystyrene, HT-53, a product by Idemitsu Petro-chemical CO.

(10) PE: polyethylene, 110J, a product by Idemitsu Petro-chemical Co. having a melt index of 14 g/10 minutes

(11) ABS: copolymeric resin of acrylonitrile, butadiene and styrene, JSR-35, a product by Japan Synthetic Rubber Co.

(12) PC: polycarbonate, N-2500, a product by Idemitsu Petro-chemical Co.

(13) PVC: poly(vinyl chloride), JZ-102F, a product by Shin-Etsu Polymer Co.

(14) PMMA: poly(methyl methacrylate), 50N, a product by Asahi Chemical Industry Co.

(15) PPO: poly(phenylene oxide), 731J, product by Engineering Plastics Co.

(16) PSO: polysulfone, P-1700, a product by Nissan Chemical Co.

(17) PI: polyimide, SP-1, a product by DuPont Far East Co.

(18) SBR: styrene-butadiene rubber, JSR-1500, a product by Japan Synthetic Rubber Co.

(19) EPR: ethylene-propylene copolymeric rubber, EP-07P, a product by Japan Synthetic Rubber Co.

(20) SR: silicone rubber, KE-931U, a product by Shin-Etsu Chemical Co.

(21) EVA: ethylene-vinyl acetate copolymer rubber, Evatate D-3021, a product by Sumitomo Chemical Co.

(22) PEE: polyester-based elastomer, Belprene P-40B, a product by Toyo Spinning Co.

(23) POE: polyolefin-based elastomer, TPE-1500, a product by Sumitomo Chemical Co.

Further, in the following examples, various kinds of fillers were used as listed below.

(1) ZN: zinc powder having an average particle diameter of about 3 μm, a product by Sakai Chemical Co.

(2) ZnO: zinc oxide having an average particle diameter of about 3 μm, a product by Sakai Chemical CO.

(3) CU: copper powder having an average particle diameter of about 5 μm, a product by Fukuda Kinzoku Hakufun Kogyo Co.

(4) α-FE: iron powder having an average particle diameter of about 0.5 μm, a product by Dowa Teppun Kogyo Co.

(5) α-Fe$_2$O$_3$: iron oxide powder having an average particle diameter of about 0.5 μm, a product by Dowa Teppun Kogyo Co.

(6) Ni: nickel powder having an average particle diameter of about 3 μm (7) Pb: lead powder having an average particle diameter of 10 μm (8) Al: aluminum powder having an average particle diameter of about 10 μm (9) Sn: tin powder having an average particle diameter of about 7 μm

(10) SnO$_2$: tin oxide powder having an average particle diameter of about 3 μm

(11) SS: stainless steel powder having an average particle diameter of about 10 μm

(12) SA: powder of solder alloy having an average particle diameter of about 8 μm

(13) BR: brass powder having an average particle diameter of about 10 μm

(14) SF: stainless steel fibers having a diameter of 10 μm and fiber length of 6 mm

(15) NF: nickel fibers having a diameter of 10 μm and fiber length of 8 mm

(16) PT: whiskers of potassium titanate having a diameter of 0.3 μm and length of 15 μm

(17) ZrO$_2$: zirconia powder having an average particle diameter of about 0.5 μm The above listed fillers were used each after a surface treatment with one of the water repellent agents shown below.

A: 3-aminopropyl triethoxy silane, a product by Nippon Unicar Co.

B: N-(2-aminoethyl)-3-aminopropyl trimethoxy silane, a product by Nippon Unicar Co.

C: methyl hydrogen polysiloxane fluid, a product by Shin-Etsu Chemical Co.

D: dimethyl silicone fluid, a product by Shin-Etsu Chemical Co.

E: isopropyl triisostearoyl titanate, a product by Ajinomoto Co.

F: isopropyl tri (N-amidoethyl aminoethyl) titanate, a product by Ajinomoto Co.

G: finely divided silica powder having an average particle diameter of about 12 μm, a product by Nippon Aerosil Co.

H: finely divided silica powder having an average particle diameter of about 7 μm, a product by Nippon Aerosil Co.

I: stearic acid

J: stearyl alcohol

K: polyethylene wax

EXAMPLE 1

A 0.3 part by weight of 3-aminopropyl triethoxy silane was sprayed to 100 parts by weight of a zinc powder having an average particle diameter of 3 μm contained in a Henschel mixer of 20 liter capacity and the mixer was run for 5 minutes at a velocity of 1000 rpm to mix them together at a temperature of 60° to 100° C. to prepare a surface-coated zinc powder. Thereafter, a 6-PA resin in an amount of 50 % by weight based on the surface-coated zinc powder was added to the mixer and melted and mixed together by running the mixer for 15 minutes at a velocity of 2000 rpm and at a temperature of 200° to 300° C. to give a composite molding resin composition with further admixture of 0.3% by weight of an antioxidant (Irganox 1010, a product by Ciba Geigy Co.), 0.3% by weight of calcium stearate as a lubricant (a product by Nippon Yushi Co.) and 1.0% by weight of carbon black (DL-600, a product by Lion Akzo Co.), each amount being based on the total amount of the 6-PA resin and the surface-coated zinc powder.

The thus obtained molding composition was pelletized by using a single-screw extruder machine (Model NVC-50, manufactured by Nakatani Machinery Co.) operated at a temperature of 200° to 300° C. with a rate of extrusion of 30 kg/hour and the pellets were shaped into test plates by injection molding using an injection molding machine (Model FS-160S; manufactured by Nissei Resin Industry Co.) at a temperature of 200° to 300° C.

The test plates were subjected to the evaluation of various properties including the following items each according to the procedure described below. The results are shown in Table 1.

(1) Resistance against rusting

A test plate of 75 mm by 75 mm wide and 3.2 mm thick was put into a bag made of a polyethylene film of 40 μm thickness and, after sealing of the opening by welding, the bag was heated for 100 hours or 300 hours in an atmosphere of 95% relative humidity at 60° C. The test plate taken out of the bag was inspected for the surface condition with naked eyes or by using a magnifying lens of 25 magnification to give the results in four ratings of A, B, C and D according to the following criteria.

A: no rust found under magnifying lens
B: powder-like rust found under magnifying lens
C: small number of rust speckles found with naked eyes
D: large number of rust speckles found with naked eyes (2) Moldability A box having outer dimensions of 150 mm by 80 mm by 80 mm with a wall thickness of 5 mm was shaped from the molding composition by injection molding using the same injection molding machine as used in the preparation of the test plates above to determine the critical impregnation pressure or minimum impregnation pressure for short shot in kg/cm². The thus molded boxes were visually inspected for the outer appearance and the results were expressed in three ratings of A, B and C according to the following criteria.

A: beautiful and acceptable
B: small number of silver marks found
C: large number of silver marks found (3) Izod impact strength Measurement was performed according to ASTM D-1302 to give the results in kg cm/cm.

(4) Electric resistance

Measurement was performed according to JIS C 1302 by using an automatic insulation-resistance tester (Model F-535F, manufactured by Fuso Electric Co.) with a voltage impression of 500 volts DC to give the total resistance in megaohm.

EXAMPLES 2 TO 65 AND COMPARATIVE EXAMPLES 1 TO 6

The experimental procedure in each of these Examples and Comparative Examples was substantially the same as in Example 1 using the same zinc powder as the filler expecting replacement of the 6-PA resin as the matrix polymer and the 3-aminopropyl triethoxy silane as the water repellent agent each with the material shown in Table 1 in an amount also indicated in the same table. In the formulations shown in Table 1, the amounts of the filler and the matrix polymer given in parts by weight are given per 100 parts by weight of the total amount of the filler after the surface treatment and the matrix polymer and the amount of the water repellent agent given in % by weight is based on the amount of the filler before the surface treatment. The molding compositions prepared in Comparative Examples 2 and 4 were disadvantageous in respect of the low productivity in pelletization due to slipping. Table 1 also shows the results of the evaluation of the products carried out in the same manner as in Example 1. In Examples 64 and 65, the zinc powder as the filler and the finely divided silica powder as the water repellent agent were dry-blended in the Henschel mixer operated at a velocity of 1000 rpm for 5 minutes at a temperature of 60° to 100° C. before the addition of the 6-PA resin.

TABLE 1

| | | Filler (parts by weight) | Water repellent agent (% by weight) | Matrix polymer (parts by weight) | Rust after 100 hours | Rust after 300 hours | Moldability Minimum pressure, kg/cm² | Appearance | Izod impact test Notched, kg·cm/cm | Izod impact test Unnotched, kg·cm/cm | Electric resistance, megaohm |
|---|---|---|---|---|---|---|---|---|---|---|---|
| Example | 1 | Zn (50) | A (0.3) | 6-PA (50) | A | A | 31 | A | 10.2 | 62 | 16 |
| | 2 | Zn (70) | A (0.3) | 6-PA (30) | A | A | 34 | A | 8.9 | 53 | 14 |
| | 3 | Zn (90) | A (0.3) | 6-PA (10) | A | A | 40 | A | 7.5 | 46 | 0.5 |
| | 4 | Zn (95) | A (0.3) | 6-PA (5) | A | A | 45 | B | 5.7 | 33 | 0.3 |
| | 5 | Zn (90) | A (1.0) | 6-PA (10) | A | A | 39 | A | 7.6 | 46 | 0.4 |
| | 6 | Zn (90) | A (3.0) | 6-PA (10) | A | A | 35 | A | 7.9 | 48 | 0.3 |
| | 7 | Zn (90) | A (0.3) | 66-PA (10) | A | A | 42 | A | 7.4 | 48 | 0.7 |
| | 8 | Zn (70) | A (0.3) | PP (30) | A | A | 34 | A | 10.0 | 78 | 13 |
| | 9 | Zn (80) | A (0.3) | PP (20) | A | A | 37 | A | 8.1 | 70 | 10 |
| | 10 | Zn (95) | A (0.3) | PP (5) | A | A | 42 | A | 7.4 | 61 | 0.5 |
| | 11 | Zn (90) | A (0.3) | PBT (10) | A | A | 45 | A | 6.7 | 41 | 0.6 |
| | 12 | Zn (90) | A (0.3) | PET (10) | A | A | 46 | A | 6.1 | 42 | 1.1 |
| | 13 | Zn (90) | A (0.3) | POM (10) | A | A | 43 | A | 7.7 | 47 | 0.9 |
| | 14 | Zn (90) | A (0.3) | PE (10) | A | A | 39 | A | 9.2 | 77 | 2.7 |
| | 15 | Zn (90) | A (0.3) | ABS (10) | A | A | 41 | A | 11.4 | 73 | 1.6 |
| Example | 18 | Zn (90) | B (0.3) | 6-PA (10) | A | A | 41 | A | 6.9 | 41 | 0.5 |
| | 19 | Zn (90) | C (0.05) | 6-PA (10) | A | B | 49 | A | 6.7 | 43 | 12 |
| | 20 | Zn (90) | C (0.5) | 6-PA (10) | A | A | 41 | A | 7.1 | 44 | 0.3 |
| | 21 | Zn (90) | C (2.0) | 6-PA (10) | A | A | 39 | A | 7.7 | 47 | 0.4 |
| | 22 | Zn (90) | C (0.5) | PP (10) | A | A | 37 | A | 8.7 | 52 | 0.9 |

TABLE 1-continued

|  |  | Filler (parts by weight) | Water repellent agent (% by weight) | Matrix polymer (parts by weight) | Rust after 100 hours | Rust after 300 hours | Moldability Minimum pressure, kg/cm² | Moldability Appearance | Izod impact test Notched, kg·cm/cm | Izod impact test Unnotched, kg·cm/cm | Electric resistance, megaohm |
| --- | --- | --- | --- | --- | --- | --- | --- | --- | --- | --- | --- |
|  | 23 | Zn (90) | C (0.5) | PBT (10) | A | A | 39 | A | 6.9 | 40 | 0.7 |
|  | 24 | Zn (90) | C (0.5) | POM (10) | A | A | 37 | A | 6.9 | 49 | 0.7 |
|  | 25 | Zn (90) | C (0.5) | ABS (10) | A | A | 37 | A | 11.7 | 71 | 0.6 |
|  | 44 | Zn (90) | D (0.5) | 6-PA (10) | A | A | 43 | A | 6.4 | 40 | 1.2 |
|  | 62 | Zn (90) | E (0.5) | 6-PA (10) | A | A | 44 | A | 6.1 | 37 | 1.7 |
|  | 63 | Zn (90) | F (0.5) | 6-PA (10) | A | A | 44 | A | 6.0 | 37 | 2.0 |
|  | 17 | Zn (90) | A (0.5) | 6-PA/PP = 5/5 (10) | A | A | 43 | A | 7.9 | 48 | 1.2 |
|  | 27 | Zn (90) | C (0.5) | 6-PA/PET = 5/5 (10) | A | A | 45 | A | 6.3 | 41 | 1.5 |
|  | 28 | Zn (90) | C (0.5) | 12-PA (10) | A | A | 35 | A | 6.6 | 41 | 0.3 |
|  | 29 | Zn (90) | C (0.5) | PS (10) | A | A | 42 | A | 6.1 | 40 | 0.3 |
| Example | 30 | Zn (90) | C (0.5) | PC (10) | A | A | 44 | A | 11.9 | 77 | 1.5 |
|  | 31 | Zn (90) | C (0.5) | PVC (10) | A | A | 37 | A | 9.7 | 70 | 0.2 |
|  | 32 | Zn (90) | C (0.5) | PMMA (10) | A | A | 33 | A | 5.9 | 37 | 2.4 |
|  | 33 | Zn (90) | C (0.5) | PPO (10) | A | A | 44 | A | 6.3 | 44 | 1.1 |
|  | 34 | Zn (90) | C (0.5) | PSO (10) | A | A | 51 | A | 7.1 | 45 | 1.0 |
|  | 35 | Zn (90) | C (0.5) | PI (10) | A | A | 51 | A | 7.4 | 60 | 1.7 |
|  | 36 | Zn (90) | C (0.5) | PPS (10) | A | A | 53 | A | 6.2 | 43 | 1.9 |
|  | 37 | Zn (90) | C (0.5) | SBR (10) | A | A | 37 | A | 17.1 | 105 | 0.1 |
|  | 38 | Zn (90) | C (0.5) | EPR (10) | A | A | 32 | A | 14.9 | 90 | 0.1 |
|  | 39 | Zn (90) | C (0.5) | SR (10) | A | A | 40 | A | 13.7 | 88 | 3.3 |
|  | 40 | Zn (90) | C (0.5) | EVA (10) | A | A | 35 | A | 15.2 | 94 | 0.4 |
|  | 41 | Zn (90) | C (0.5) | PEE (10) | A | A | 39 | A | 11.7 | 75 | 0.5 |
|  | 42 | Zn (90) | C (0.5) | POE (10) | A | A | 36 | A | 14.2 | 89 | 0.5 |
|  | 64 | Zn (90) | G (0.5) | 6-PA (10) | A | A | 39 | A | 6.3 | 42 | 0.9 |
|  | 65 | Zn (90) | H (0.5) | 6-PA (10) | A | A | 38 | A | 6.5 | 44 | 0.8 |
| Example | 45 | Zn (50) | D (0.5) | 66-PA (50) | A | A | 34 | A | 11.5 | 64 | 15 |
|  | 46 | Zn (70) | D (0.5) | 66-PA (30) | A | A | 35 | A | 9.2 | 56 | 14 |
|  | 47 | Zn (90) | D (0.5) | 66-PA (10) | A | A | 41 | A | 7.5 | 49 | 0.7 |
|  | 48 | Zn (95) | D (0.5) | 66-PA (5) | A | A | 47 | A | 5.9 | 35 | 0.3 |
|  | 49 | Zn (90) | D (1.0) | 66-PA (10) | A | A | 39 | A | 7.9 | 50 | 0.7 |
|  | 50 | Zn (90) | D (3.0) | 66-PA (10) | A | A | 37 | A | 8.0 | 51 | 0.6 |
|  | 51 | Zn (50) | D (0.5) | 12-PA (50) | A | A | 30 | A | 9.7 | 55 | 14 |
|  | 52 | Zn (90) | D (0.5) | 12-PA (30) | A | A | 32 | A | 8.0 | 49 | 12 |
|  | 53 | Zn (90) | D (0.5) | 12-PA (10) | A | A | 33 | A | 6.9 | 44 | 0.3 |
|  | 54 | Zn (95) | D (0.5) | 12-PA (5) | A | A | 39 | A | 5.0 | 30 | 0.3 |
|  | 55 | Zn (90) | D (1.0) | 12-PA (10) | A | A | 31 | A | 7.0 | 45 | 0.3 |
|  | 56 | Zn (90) | D (3.0) | 12-PA (10) | A | A | 30 | A | 7.1 | 45 | 0.3 |
|  | 16 | Zn (90) | D (3.0) | 12-PA (10) | A | A | 34 | A | 6.7 | 42 | 0.4 |
|  | 26 | Zn (90) | C (0.5) | 66-PA (10) | A | A | 41 | A | 7.5 | 50 | 0.7 |
|  | 57 | Zn (90) | D (0.5) | 66-PA (10) | A | A | 35 | A | 8.9 | 54 | 0.6 |
| Example | 58 | Zn (90) | D (0.5) | 66-PA (10) | A | A | 37 | A | 7.0 | 41 | 0.6 |
|  | 43 | Zn (90) | C (0.5) | 6PA/PP = 5/5 (10) | A | A | 42 | A | 8.1 | 50 | 1.1 |
|  | 59 | Zn (90) | D (0.5) | 6-PA/PP = 5/5 (10) | A | A | 40 | A | 8.2 | 53 | 1.0 |
|  | 60 | Zn (70) | D (0.5) | 6-PA/PP = 5/5 (30) | A | A | 33 | A | 8.9 | 54 | 15 |
|  | 61 | Zn (50) | D (0.5) | 6-PA/PP = 5/5 (50) | A | A | 30 | A | 10.5 | 64 | 16 |
| Comparative Example | 1 | Zn (90) | A (0.005) | 6-PA (10) | C | D | 51 | C | 4.3 | 19 | 1.0 |
|  | 2 | Zn (90) | A (6.0) | 6-PA (10) | A | A | 35 | C | 6.1 | 41 | 29 |
|  | 3 | Zn (90) | C (0.005) | 6-PA (10) | C | D | 67 | B | 4.7 | 22 | 35 |
|  | 4 | Zn (90) | C (6.0) | 6-PA (10) | A | A | 35 | C | 6.0 | 39 | 27 |
|  | 5 | Zn (25) | A (0.3) | 6-PA (75) | A | A | 28 | A | 13.1 | 73 | 100< |
|  | 6 | Zn (99) | A (0.3) | 6-PA (1) | B | C | 61 | C | 1.9 | 10 | 40 |

EXAMPLES 66 TO 103 AND COMPARATIVE EXAMPLES 7 TO 13

The experimental procedure in each of these Examples and Comparative Examples was substantially the same as in Example 1. Table 2 below shows the formulation of the molding compositions and the results of evaluation undertaken in the same manner as in Example 1. Examples 104 to 107 and Comparative Examples 14 and 15.

A molding resin composition was prepared by first blending, in a Henschel mixer of 20 liter capacity, 15 parts by weight of a 6-PA resin, 85 parts by weight of a ZnO powder having a varied average particle diameter shown in Table 3 below, 0.5 part by weight of a low-molecular oxidized polypropylene having an average molecular weight of 3500 and 0.3 part by weight of an aminosilane-based coupling agent and then kneading the blend thoroughly at 220° to 350° C. in a double-screw kneading machine (Model NAS-50, manufactured by Nakatani Machinery Co.).

The thus prepared molding resin composition were each shaped by injection molding into test plates at 220° to 350° C. using the same injection molding machine as used in Example 1. The molding compositions were evaluated by measuring the minimum molding pressure in the injection molding of the composition and the mechanical and electrical properties of the test plates in the following manner. The results are shown in Table 3.

(3) Electrical properties: specific resistance in ohm-cm was determined according to Japan Rubber Association Standard SRJS-2301-1969.

TABLE 3

| | | Average Particle diameter of ZnO, μm | Molding pressure, kg/cm² G | Tensile strength, kg/cm² | Flexural strength, kg/cm² | Elastic modulus by bending, × 10⁴ kg/cm² | Specific resistance, ohm · cm |
|---|---|---|---|---|---|---|---|
| Example | 104 | 0.3 | 75 | 860 | 1510 | 12.8 | 1 × 10⁵ |
| | 105 | 1 | 70 | 810 | 1450 | 12.5 | 1 × 10⁵ |
| | 106 | 3 | 67 | 795 | 1320 | 11.7 | 1 × 10⁵ |
| | 107 | 5 | 65 | 710 | 1250 | 10.9 | 1 × 10⁵ |
| Comparative Example | 14 | 0.1 | 97 | 905 | 1570 | 13.1 | 1 × 10⁵* |
| | 15 | 9 | 60 | 650 | 990 | 9.1 | 1 × 10⁵ |

*large variation in the values of specific resistance

In these Examples and Comparative Examples, the

TABLE 2

| | | Filler (parts by weight) | Water repellent agent (% by weight) | Matrix polymer (parts by weight) | Rust after 100 hours | Rust after 300 hours | Moldability Minimum pressure, kg/cm² | Appearance | Izod impact test Notched, kg·cm/cm | Izod impact test Unnotched, kg·cm/cm | Electric resistance, megaohm |
|---|---|---|---|---|---|---|---|---|---|---|---|
| Example | 66 | ZnO (90) | C (0.5) | 6-PA (10) | A | A | 43 | A | 7.1 | 42 | — |
| | 71 | ZnO (90) | A (0.5) | 6-PA (10) | A | A | 41 | A | 7.0 | 42 | — |
| | 84 | Cu (90) | C (0.5) | 6-PA (10) | A | A | 47 | A | 8.7 | 48 | 17 |
| | 85 | Cu (90) | A (0.5) | 6-PA (10) | A | A | 45 | A | 8.9 | 50 | 19 |
| | 86 | Fe (90) | C (0.5) | 6-PA (10) | A | A | 48 | A | 6.1 | 39 | 15 |
| | 87 | Fe (90) | A (0.5) | 6-PA (10) | A | A | 44 | A | 6.3 | 40 | 15 |
| | 88 | Fe₂O₃ (90) | C (0.5) | 6-PA (10) | A | A | 49 | A | 5.7 | 38 | 5.4 |
| | 89 | Fe₂O₃ (90) | A (0.5) | 6-PA (10) | A | A | 44 | A | 5.9 | 41 | 7.0 |
| | 90 | Zn/Fe₂O₃ = 45/45 (90) | A (0.5) | 6-PA (10) | A | A | 44 | A | 6.0 | 35 | 0.7 |
| | 91 | Zn/ZnO = 70/20 (90) | C (0.5) | 6-PA (10) | A | A | 40 | A | 7.2 | 44 | 1.0 |
| | 92 | Ni (90) | C (0.5) | 6-PA (10) | A | A | 43 | A | 6.4 | 35 | 0.2 |
| | 93 | Pb (90) | C (0.5) | 6-PA (10) | A | A | 42 | A | 7.9 | 48 | 1.4 |
| | 94 | Al (90) | C (0.5) | 6-PA (10) | A | A | 39 | A | 8.2 | 50 | 1.9 |
| | 95 | Sn (90) | C (0.5) | 6-PA (10) | A | A | 44 | A | 7.1 | 44 | 0.3 |
| Example | 96 | SnO₂ (90) | C (0.5) | 6-PA (10) | A | A | 46 | A | 6.0 | 38 | 0.3 |
| | 97 | SnO₂ (90) | C (0.5) | 6-PA (10) | A | A | 39 | A | 6.4 | 44 | 0.2 |
| | 98 | SnO₂ (90) | C (0.5) | 6-PA (10) | A | A | 37 | A | 7.2 | 46 | 0.5 |
| | 99 | SnO₂ (90) | C (0.5) | 6-PA (10) | A | A | 38 | A | 6.6 | 45 | 0.3 |
| | 100 | SnO₂ (90) | C (0.5) | 6-PA (10) | A | A | 52 | A | 5.4 | 35 | 0.1 |
| | 101 | SnO₂ (90) | C (0.5) | 6-PA (10) | A | A | 51 | A | 5.9 | 37 | 0.1 |
| | 102 | SnO₂ (90) | C (0.5) | 6-PA (10) | A | A | 42 | A | 6.7 | 41 | 0.9 |
| | 103 | SnO₂ (90) | C (0.5) | 6-PA (10) | A | A | 47 | A | 6.9 | 45 | 2.1 |
| Comparative Example | 7 | Fe₂O₃ (90) | C (0.005) | 6-PA (10) | C | D | 69 | C | 1.7 | 12 | 50 |
| | 8 | Fe₂O₃ (90) | A (0.005) | 6-PA (10) | C | D | 71 | C | 2.3 | 14 | 70 |
| | 9 | Zn (90) | A (0.5) | 6-PA (10) | B | C | 59 | B | 4.3 | 21 | 75 |
| | 10 | Zn (90) | C (0.5) | 6-PA (10) | A | B | 62 | B | 3.1 | 16 | 10 |
| | 11 | Zn (90) | G (0.5) | 6-PA (10) | C | D | 57 | B | 3.2 | 17 | 100< |
| | 12 | Fe₂O₃ (90) | A (0.5) | 6-PA (10) | B | C | 61 | B | 2.0 | 15 | 100< |
| | 13 | Fe (90) | C (0.5) | 6-PA (10) | B | B | 64 | B | 2.3 | 16 | 11 |

(1) Molding pressure: a box having dimensions of 90 mm by 150 mm by 70 mm with a wall thickness of 5 mm and a pin gate of 1 mm diameter was shaped by injection molding under the above mentioned conditions to determine the minimum pressure for impregnation in kg/cm² G.

(2) Mechanical properties: tensile strength in kg/cm² of the test plates was determined according to ASTM D-638 and flexural strength and elastic modules by bending each in kg/cm² were determined according to ASTM D-790.

low-molecular oxidized polypropylene was a commercial product (Biscol TS-200, a product by Sanyo Kasei Co.) and the aminosilane-based coupling agent was aminopropyl triethoxy silane. Examples 108 to 110 and Comparative Example 16 and 17.

The formulation and experimental procedure in each of these Examples and Comparative Examples were substantially the same as in Examples 104 to 107 except that the amounts of the 6-PA resin and ZnO, having an average particle diameter of 2 μm, were varied as shown in Table 4 below, which also shows the results of evaluation of the molding resin compositions carried out in the same manner as in the preceding examples.

TABLE 4

|  |  | 6-PA, parts by weight | ZnO, parts by weight | Molding pressure, kg/cm² G | Tensile strength, kg/cm² | Flexural strength, kg/cm² | Elastic modulus by bending, × 10⁴ kg/cm² | Specific resistance, ohm · cm |
|---|---|---|---|---|---|---|---|---|
| Example | 108 | 40 | 60 | 61 | 870 | 1550 | 9.2 | 1 × 10⁷ |
|  | 109 | 20 | 80 | 68 | 875 | 1470 | 12.1 | 1 × 10⁵ |
|  | 110 | 5 | 95 | 74 | 760 | 1350 | 13.5 | 1 × 10⁴ |
| Comparative Example | 16 | 60 | 40 | 49 | 920 | 1660 | 7.4 | 1 × 10¹¹ |
|  | 17 | 3 | 97 | 150 | 620 | 1290 | 14.6 | 1 × 10⁴ |

EXAMPLES 111 TO 113 AND COMPARATIVE EXAMPLES 18 AND 19

The formulation and experimental procedure were substantially the same as in the preceding examples except that the amounts of the 6-PA resin and ZnO filler were 15 parts by weight and 85 parts by weight, respectively, in each of these Examples and Comparative Examples and the amount of the low-molecular oxidized polypropylene, referred to as the component (C) hereinbelow, was varied as indicated in Table 5 below, which also shows the results of evaluation of the molding resin compositions carried out in the same manner as in the preceding examples.

TABLE 5

|  |  | Component (C), parts by weight | Molding pressure, kg/cm² G | Tensile strength, kg/cm² | Flexural strength, kg/cm² | Elastic modulus by bending, × 10⁴ kg/cm² | Specific resistance, ohm · cm |
|---|---|---|---|---|---|---|---|
| Example | 111 | 0.1 | 90 | 705 | 1120 | 10.1 | 1 × 10⁵ |
|  | 112 | 0.7 | 67 | 830 | 1490 | 12.7 | 1 × 10⁵ |
|  | 113 | 1.5 | 59 | 755 | 1300 | 11.6 | 1 × 10⁵ |
| Comparative Example | 18 | 0.05 | 120 | 520 | 950 | 9.7 | 1 × 10⁷ |
|  | 19 | 2.5 | 51 | 670 | 970 | 9.6 | 1 × 10⁵ |

EXAMPLES 114 TO 117

The formulation and experimental procedure in each of these Examples were substantially the same as in the preceding examples except that the amount of the component (C) was always 0.5 part by weight and, instead, the average molecular weight thereof was varied as indicated in Table 6 given below, which also shows the results of evaluation of the molding resin compositions carried out in the same manner as in the preceding examples.

TABLE 6

|  |  | Average molecular weight of component (C) | Molding pressure, g/cm² G | Tensile strength, kg/cm² | Flexural strength, kg/cm² | Elastic modulus by bending, × 10⁴ kg/cm² | Specific resistance, ohm · cm |
|---|---|---|---|---|---|---|---|
| Example | 114 | 7000 | 75 | 815 | 1460 | 12.7 | 1 × 10⁵ |
|  | 115 | 15000 | 72 | 820 | 1470 | 12.9 | 1 × 10⁵ |
|  | 116 | 20000 | 80 | 830 | 1500 | 13.1 | 1 × 10⁵ |
|  | 117 | 25000 | 90 | 845 | 1510 | 13.4 | 1 × 10⁵ |

EXAMPLES 118 TO 120 AND COMPARATIVE EXAMPLES 20 AND 21

The formulation and experimental procedure in each of these Examples and Comparative Examples were substantially the same as in the preceding examples except that the low-molecular oxidized polypropylene as the component (C) always has an average molecular weight of 3500 and amount of the 3-aminopropyl triethoxy silane as the aminosilane-based coupling agent was varied as indicated in Table 7 below, which also shows the results of evaluation of the molding resin compositions carried out in the same manner as in the preceding examples.

TABLE 7

|  | Aminosilane, parts by weight | Molding pressure, kg/cm² G | Tensile strength, kg/cm² | Flexural strength, kg/cm² | Elastic modulus by bending, × 10⁴ kg/cm² | Specific resistance, ohm · cm |
|---|---|---|---|---|---|---|
| Example |  |  |  |  |  |  |
| 118 | 0.1 | 87 | 760 | 1310 | 11.9 | 1 × 10⁵ |
| 119 | 0.7 | 65 | 830 | 1490 | 13.0 | 1 × 10⁵ |
| 120 | 1.5 | 61 | 760 | 1310 | 12.1 | 1 × 10⁵ |
| Comparative Example |  |  |  |  |  |  |
| 20 | 0.05 | 105 | 550 | 970 | 10.1 | 1 × 10⁷ |
| 21 | 2.5 | 57 | 720 | 960 | 10.5 | 1 × 10⁸* |

*large variation in the values as measured

EXAMPLES 121 TO 134

The formulation and experimental procedure in each of these Examples were substantially the same as in the preceding Examples except that the amount of the 3-aminopropyl triethoxy silane was always 0.3 part by weight and the thermoplastic resin, taken in an amount of 15 parts by weight, was not the 6-PA resin but one of the polymers or a combination of two polymers in a proportion as indicated in Table 8 below, which also shows the results of evaluation of the molding compositions carried out in the same manner as in the preceding examples. The values of specific resistance of the test plates were each $1 \times 10^5$ ohm·cm.

TABLE 8

| Example | Polymer(s) (ratio by weight) | Molding pressure, kg/cm² G | Tensile strength, kg/cm² | Flexural strength, kg/cm² | Elastic modulus by bending, × 10⁴ kg/cm² |
|---|---|---|---|---|---|
| 121 | 66-PA | 73 | 820 | 1470 | 12.9 |
| 122 | MXDA | 75 | 840 | 1500 | 13.0 |
| 123 | PET | 73 | 890 | 1620 | 13.4 |
| 124 | PBT | 74 | 795 | 1240 | 11.1 |
| 125 | PPO | 77 | 810 | 1450 | 12.7 |
| 126 | PC | 76 | 835 | 1490 | 12.9 |
| 127 | ABS | 67 | 720 | 1150 | 10.1 |
| 128 | POM | 70 | 805 | 1390 | 12.0 |
| 129 | PP | 47 | 510 | 910 | 6.2 |
| 130 | PE | 44 | 460 | 810 | 5.4 |
| 131 | PPO/6-PA (9:6) | 74 | 830 | 1490 | 12.9 |
| 132 | PC/PET (10:5) | 74 | 870 | 1520 | 12.9 |
| 133 | PBT/PET (9:6) | 74 | 850 | 1430 | 12.7 |
| 134 | PSO | 85 | 810 | 1350 | 13.1 |

EXAMPLES 135 TO 139

The formulation and experimental procedure in each of these Examples were substantially the same as in the preceding Examples except that the polymer for the matrix was one of those indicated in Table 9 below and 0.3 part by weight of 3-aminopropyl triethoxy silane was replaced with 0.5 part by weight of a dimethyl silicone fluid. Table 9 below also shows the results of evaluation of the molding resin compositions carried out in the same manner as in the preceding examples. The values of specific resistance of the test plates were each $1 \times 10^5$ ohm·cm.

TABLE 9

| Example | Polymer | Molding pressure, kg/cm² G | Tensile strength, kg/cm² | Flexural strength, kg/cm² | Elastic modulus by bending, × 10⁴ kg/cm² |
|---|---|---|---|---|---|
| 135 | 6-PA | 65 | 795 | 1390 | 12.3 |
| 136 | 12-PA | 61 | 720 | 1190 | 11.7 |
| 137 | 66-PA | 71 | 835 | 1510 | 13.1 |
| 138 | PBT | 71 | 815 | 1290 | 11.9 |
| 139 | PP | 44 | 525 | 990 | 6.4 |

EXAMPLES 140 TO 144

The formulation and experimental procedure in each of these Examples were substantially the same as in the preceding Examples except that the polymer for the matrix phase was one of those indicated in Table 10 below and the dimethyl silicone fluid was replaced with the same amount of isopropyl triisostearoyl titanate as a titanate-based coupling agent. Table 10 below also shows the results of evaluation of the molding resin compositions carried out in the same manner as in the preceding examples. The values of specific resistance of the test plates were each $1 \times 10^5$ ohm·cm.

TABLE 10

| Example | Polymer | Molding pressure, kg/cm² G | Tensile strength, kg/cm² | Flexural strength, kg/cm² | Elastic modulus by bending, × 10⁴ kg/cm² |
|---|---|---|---|---|---|
| 140 | 6-PA | 71 | 805 | 1410 | 12.9 |
| 141 | 12-PA | 66 | 700 | 1190 | 10.1 |
| 142 | 66-PA | 72 | 840 | 1530 | 13.3 |
| 143 | PBT | 73 | 815 | 1280 | 12.0 |
| 144 | PP | 46 | 510 | 975 | 6.1 |

PREPARATION EXAMPLE 1 (PREPARATION OF MODIFIED POLYPROPYLENE)

Into a three-necked flask equipped with a stirrer, thermometer and reflux condenser and having a separable cover were introduced 100 parts by weight of a polypropylene resin having a density of 0.91 g/cm³ and a melt index MI of 8 g/10 minutes (J700G, a product by Idemitsu Petrochemical Co.), 5 parts by weight of a 1,4-polybutadiene having a number-average molecular weight of 3000 and terminated at each molecular chain end with a hydroxy group (Poly bd R45HT, a product by ARCO Chem. Div.), 20 parts by weight of maleic anhydride, 1.72 parts by weight of dicumyl peroxide and 600 parts by weight of xylene and the mixture was heated under agitation at 120° C. for 1 hour and then at 140° C. for 3 hours to effect the reaction.

After completion of the reaction, the reaction mixture was poured into a large volume of acetone and the precipitates formed in acetone were collected by filtration with suction and dried at 70° C. for 50 hours to give a white powder. This powder was subjected to extraction with acetone in a Soxhlet extractor for 16 hours to give a modified polypropylene as the product by removing unreacted polybutadiene and maleic anhydride.

EXAMPLES 145 TO 172 AND COMPARATIVE EXAMPLES 22 TO 29

A Henschel mixer was charged with 10 parts by weight of one of the fibrous fillers indicated in Table 11, 70 parts by weight of a zinc powder having an average particle diameter of about 3 μm and 0.5 part by weight of a dimethyl silicone fluid and operated at a velocity of 1000 rpm for 5 minutes at a temperature of 60° to 100° C. to coat the surface of the fibers and zinc particles with the silicone fluid. Thereafter, 20 parts by weight of a 6-PA resin were introduced into the mixer and thoroughly blended together. The thus obtained blend was further kneaded at 220° to 350° C. in a double-screw extruder machine to give a molding resin composition which was then shaped into test plates at 220° to 350° C. by injection molding using the same injection machine as used in Example 1. The molding resin composition were evaluated for the moldability of the composition, mechanical properties of the test plates, molding shrinkage of the molded articles and warping distortion of the molded articles in the following manner.

(1) Moldability of the molding composition

A box having dimension of 90 mm by 70 mm with a wall thickness of 5 mm and a pin gate of 1 mm diameter was shaped from the molding composition by injection molding using an injection molding machine (Model IS-125, manufactured by Toshiba Machines Co.) operated under the standard conditions of a cylinder temperature of 200° to 300° C., temperature of metal mold of 75° to 100° C., injection pressure of 60 kg/cm² and shot time of 20 seconds and the moldability of the molding composition was evaluated according to the following criteria in three ratings in terms of the reproducibility of the box configuration by the injection molding and the injection pressure.

A: quite satisfactory

B: appearance of sink marks at some portions, somewhat higher injection pressure than the standard pressure C: partly incomplete box configuration, injection pressure of 100 kg/cm² G or higher (2) Mechanical properties of the test plates Tensile strength was determined according to ASTM D-638, Izod impact value was determined according to ASTM D-256 and flexural strength and elastic modules by bending were determined according to ASTM D-790.

(3) Molding shrinkage of molded articles

Square test plates of 76 mm by 76 mm wide and 3.2 mm thick were shaped from the molding composition by injection molding under a sufficiently high injection pressure and the changes of the dimensions in % were determined in the molding direction (MD) and transverse direction (TD).

(4) Warping distortion of shaped articles

A circular disc of 45 mm diameter and 2 mm thickness was shaped by injection molding under the same conditions as above and warping of the disc was evaluated by the height $a$ of the highest point when the disc was placed on a horizontal plane. The results were given in three ratings of A, B, C according to the following criteria.

A: $a < 0.5$ mm

B: $0.5$ mm $\leq a \leq 1$ mm

C: $a > 1$ mm

Table 11 given below shows the formulation of the molding resin compositions and the results of the evaluation thereof performed in the above described manner. In Table 11, the kinds of the fibrous fillers are indicated with the symbols of GF, SF, BF, PT, CF, SCF and APAF for glass fibers, stainless steel fibers, brass fibers, whiskers of potassium titanate, carbon fibers, silicone carbide fibers and aromatic polyamide fibers, respectively.

TABLE 11

| | Fibrous filler | | | | Tensile strength, kg/cm² | Izod impact value, kg·cm/cm | Flexural strength, kg/cm² |
|---|---|---|---|---|---|---|---|
| | Kind | Length, mm | Diameter, μm | Aspect ratio | | | |
| Example | | | | | | | |
| 145 | GF | 10 | 4 | 2500 | 1650 | 101 | 2450 |
| 146 | | 10 | 13 | 770 | 1550 | 94 | 2300 |
| 147 | | 6 | 4 | 1500 | 1600 | 97 | 2350 |
| 148 | | 6 | 13 | 462 | 1570 | 94 | 2250 |
| 149 | | 3 | 4 | 750 | 1530 | 94 | 2280 |
| 150 | | 3 | 12 | 231 | 1500 | 94 | 2200 |
| 151 | | 1 | 4 | 250 | 1500 | 90 | 2150 |
| 152 | | 1 | 13 | 77 | 1350 | 80 | 2050 |
| 153 | SF | 10 | 30 | 333 | 1450 | 77 | 1900 |
| 154 | | 10 | 60 | 167 | 1300 | 73 | 1810 |
| 155 | | 6 | 30 | 200 | 1330 | 73 | 1800 |
| 156 | | 6 | 60 | 100 | 1200 | 66 | 1760 |
| 157 | | 3 | 30 | 100 | 1200 | 65 | 1720 |
| 158 | | 3 | 60 | 50 | 1150 | 60 | 1670 |
| 159 | BF | 10 | 30 | 333 | 1430 | 75 | 1900 |
| 160 | | 10 | 60 | 167 | 1290 | 71 | 1820 |
| 161 | | 6 | 30 | 200 | 1300 | 71 | 1790 |
| 162 | | 6 | 60 | 100 | 1210 | 66 | 1720 |
| 163 | | 3 | 30 | 100 | 1190 | 64 | 1710 |
| 164 | | 3 | 60 | 50 | 1110 | 61 | 1650 |

| | Elastic modulus by bending, × 10⁴ kg/cm² | Molding shrinkage, % | | Warping distortion | Moldability | Density, g/cm³ |
|---|---|---|---|---|---|---|
| | | MD | TD | | | |
| Example | | | | | | |
| 145 | 12.7 | 0.82 | 0.45 | B | B | 3.21 |
| 146 | 12.2 | 0.80 | 0.45 | A | A | 3.21 |
| 147 | 12.0 | 0.79 | 0.45 | A | A | 3.21 |
| 148 | 12.1 | 0.80 | 0.45 | A | A | 3.21 |
| 149 | 12.1 | 0.80 | 0.45 | A | A | 3.21 |
| 150 | 11.5 | 0.82 | 0.52 | A | A | 3.21 |
| 151 | 10.9 | 0.82 | 0.51 | A | A | 3.21 |
| 152 | 10.1 | 0.85 | 0.60 | A | A | 3.21 |
| 153 | 12.5 | 0.91 | 0.55 | A | A | 3.49 |

TABLE 11-continued

| | | | | | | | |
|---|---|---|---|---|---|---|---|
| 154 | 12.0 | 0.89 | 0.54 | A | A | 3.49 | |
| 155 | 11.9 | 0.86 | 0.54 | A | A | 3.49 | |
| 156 | 11.6 | 0.85 | 0.58 | A | A | 3.49 | |
| 157 | 11.6 | 0.85 | 0.57 | A | A | 3.49 | |
| 158 | 11.3 | 0.85 | 0.61 | A | A | 3.49 | |
| 159 | 12.7 | 0.92 | 0.57 | A | A | 3.50 | |
| 160 | 11.9 | 0.90 | 0.55 | A | A | 3.50 | |
| 161 | 11.9 | 0.87 | 0.54 | A | A | 3.50 | |
| 162 | 11.4 | 0.86 | 0.56 | A | A | 3.50 | |
| 163 | 11.4 | 0.85 | 0.58 | A | A | 3.50 | |
| 164 | 11.1 | 0.85 | 0.63 | A | A | 3.50 | |

| | Fibrous filler | | | Tensile strength, $kg/cm^2$ | Izod impact value, $kg \cdot cm/cm$ | Flexural strength, $kg/cm^2$ |
|---|---|---|---|---|---|---|
| | Kind | Length, mm | Diameter, $\mu m$ | Aspect ratio | | | |

| | Kind | Length, mm | Diameter, $\mu m$ | Aspect ratio | Tensile strength, $kg/cm^2$ | Izod impact value, $kg \cdot cm/cm$ | Flexural strength, $kg/cm^2$ |
|---|---|---|---|---|---|---|---|
| Example | | | | | | | |
| 165 | PT | 0.01 | 0.1 | 100 | 1250 | 100 | 1750 |
| 166 | | 0.02 | 0.1 | 200 | 1310 | 105 | 1810 |
| 167 | CF | 10 | 10 | 1000 | 1820 | 109 | 1950 |
| 168 | | 3 | 10 | 300 | 1650 | 102 | 1800 |
| 169 | SCF | 10 | 10 | 1000 | 2030 | 111 | 2590 |
| 170 | | 3 | 10 | 300 | 1910 | 104 | 2400 |
| 171 | APAF | 6 | 12 | 500 | 1850 | 109 | 2100 |
| 172 | | 3 | 12 | 250 | 1710 | 104 | 1980 |
| Comparative Example | | | | | | | |
| 22 | GF | 12 | 4 | 3000 | 1710 | 105 | 2550 |
| 23 | | 0.12 | 4 | 30 | 820 | 51 | 1270 |
| 24 | SF | 30 | 10 | 3000 | 1500 | 79 | 2050 |
| 25 | | 0.3 | 10 | 30 | 710 | 47 | 980 |
| 26 | BF | 30 | 10 | 3000 | 1410 | 71 | 1990 |
| 27 | | 0.3 | 10 | 30 | 660 | 40 | 900 |
| 28 | CF | 30 | 10 | 3000 | 1900 | 110 | 2050 |
| 29 | | 0.3 | 10 | 30 | 790 | 59 | 1110 |

| | Elastic modulus by bending, $\times 10^4 kg/cm^2$ | Molding shrinkage, % MD | Molding shrinkage, % TD | Warping distortion | Moldability | Density, $g/cm^3$ |
|---|---|---|---|---|---|---|
| Example | | | | | | |
| 165 | 10.0 | 0.75 | 0.44 | A | A | 3.30 |
| 166 | 10.5 | 0.75 | 0.45 | A | A | 3.30 |
| 167 | 9.7 | 0.80 | 0.45 | A | A | 2.97 |
| 168 | 8.1 | 0.80 | 0.45 | A | A | 2.97 |
| 169 | 15.4 | 0.78 | 0.42 | A | A | 3.28 |
| 170 | 14.2 | 0.80 | 0.44 | A | A | 3.28 |
| 171 | 10.9 | 0.80 | 0.45 | A | A | 2.92 |
| 172 | 9.2 | 0.80 | 0.45 | A | A | 2.92 |
| Comparative Example | | | | | | |
| 22 | 12.9 | 0.90 | 0.45 | C | B | 3.21 |
| 23 | 7.7 | 0.79 | 0.57 | A | A | 3.21 |
| 24 | 12.7 | 0.93 | 0.55 | C | B | 3.49 |
| 25 | 7.1 | 0.81 | 0.59 | A | A | 3.49 |
| 26 | 12.4 | 0.93 | 0.55 | C | B | 3.50 |
| 27 | 6.9 | 0.82 | 0.59 | A | A | 3.50 |
| 28 | 10.6 | 0.89 | 0.43 | C | B | 2.97 |
| 29 | 8.2 | 0.75 | 0.42 | A | A | 2.97 |

EXAMPLES 173 TO 183 AND COMPARATIVE EXAMPLES 30 TO 39

The experimental procedure in each of these Examples and Comparative Examples was substantially the same as in the preceding examples except that each of the molding resin composition was compounded from 20 parts by weight of the 6-PA resin, a varied amount as indicated in Table 12 below of a zinc powder having an average particle diameter of about 3 $\mu m$ and a varied amount of a fibrous filler, i.e. glass fibers (GF), stainless steel fibers (SF), potassium titanate whiskers (PT) or carbon fibers (CF), as indicated in Table 12. The results of the evaluation of these molding resin composition are also shown in Table 12 for the same items as in Table 11 in the preceding examples.

TABLE 12

| | Zinc powder, parts by weight | Fibrous filler Kind | Fibrous filler Aspect ratio | Fibrous filler Parts by weight | Tensile strength, $kg/cm^2$ | Izod impact value, $kg \cdot cm/cm$ | Flexural strength, $kg/cm^2$ |
|---|---|---|---|---|---|---|---|
| Example | | | | | | | |
| 173 | 75 | GF | 750 | 5 | 1270 | 80 | 1770 |
| 174 | 50 | | 750 | 30 | 1890 | 110 | 2670 |

TABLE 12-continued

| | | | | | | | |
|---|---|---|---|---|---|---|---|
| 175 | 75 | | 231 | 5 | 1210 | 80 | 1690 |
| 176 | 50 | | 231 | 30 | 1820 | 97 | 2570 |
| 177 | 75 | SF | 200 | 5 | 1110 | 69 | 1520 |
| 178 | 50 | | 200 | 30 | 1690 | 87 | 2050 |
| 179 | 75 | PT | 200 | 5 | 1190 | 90 | 1620 |
| 180 | 50 | | 200 | 30 | 1590 | 118 | 2300 |
| 181 | 75 | CF | 300 | 5 | 1400 | 91 | 1690 |
| 182 | 50 | | 300 | 30 | 1870 | 105 | 2010 |
| 183 | 30 | | 300 | 40 | 1990 | 111 | 2220 |
| Comparative Example | | | | | | | |
| 30 | 79 | GF | 750 | 1 | 870 | 59 | 1260 |
| 31 | 20 | | 750 | 60 | 2110 | 115 | 2790 |
| 32 | 79 | | 231 | 1 | 800 | 57 | 1200 |
| 33 | 20 | SF | 231 | 60 | 2050 | 111 | 2550 |
| 34 | 79 | | 200 | 1 | 810 | 47 | 1020 |
| 35 | 20 | | 200 | 60 | 1820 | 89 | 2560 |
| 36 | 79 | PT | 200 | 1 | 770 | 79 | 1090 |
| 37 | 20 | | 200 | 60 | 1780 | 121 | 2520 |
| 38 | 79 | CF | 300 | 1 | 900 | 79 | 1110 |
| 39 | 20 | | 300 | 60 | 2110 | 114 | 2300 |

| | Elastic modulus by bending, × $10^4$ kg/cm$^2$ | Molding shrinkage, % | | Warping distortion | Moldability | Density, g/cm$^3$ |
|---|---|---|---|---|---|---|
| | | MD | TD | | | |
| Example | | | | | | |
| 173 | 10.9 | 0.85 | 0.50 | A | A | 3.34 |
| 174 | 13.2 | 0.75 | 0.44 | A | A | 2.80 |
| 175 | 10.1 | 0.85 | 0.51 | A | A | 3.34 |
| 176 | 12.7 | 0.74 | 0.43 | A | A | 2.80 |
| 177 | 10.0 | 0.88 | 0.55 | A | A | 3.45 |
| 178 | 12.1 | 0.79 | 0.50 | A | A | 3.52 |
| 179 | 8.9 | 0.79 | 0.47 | A | A | 3.39 |
| 180 | 12.2 | 0.71 | 0.41 | A | A | 3.02 |
| 181 | 7.2 | 0.83 | 0.46 | A | A | 3.20 |
| 182 | 10.9 | 0.77 | 0.44 | A | A | 2.30 |
| 183 | 11.7 | 0.76 | 0.44 | A | A | 1.75 |
| Comparative Example | | | | | | |
| 30 | 8.2 | 1.00 | 0.81 | C | A | 3.45 |
| 31 | 15.4 | 0.70 | 0.41 | A | C | 2.48 |
| 32 | 7.9 | 1.01 | 0.83 | C | A | 3.45 |
| 33 | 14.0 | 0.73 | 0.42 | A | C | 2.48 |
| 34 | 7.9 | 1.00 | 0.82 | C | A | 3.47 |
| 35 | 13.7 | 0.75 | 0.47 | A | C | 3.56 |
| 36 | 7.1 | 1.00 | 0.79 | C | A | 3.45 |
| 37 | 13.9 | 0.70 | 0.40 | A | C | 2.77 |
| 38 | 6.2 | 1.01 | 0.80 | C | A | 3.41 |
| 39 | 12.8 | 0.75 | 0.43 | A | C | 1.89 |

EXAMPLES 184 TO 204 AND COMPARATIVE EXAMPLES 40 TO 45

The experimental procedure in each of these Examples and Comparative Examples was substantially the same as in the preceding examples except that the molding resin composition were each compounded from 20 parts by weight of the 6-PA resin, 10 parts by weight of glass fibers having an aspect ratio of 231 and 70 parts by weight of a particulate filler indicated in Table 13 below, which also shows the results of the evaluation of the molding compositions.

EXAMPLES 205 to 223.

The experimental procedure in each of these Examples was substantially the same as in Examples 145 to 172 except that the molding resin composition were each compounded from 10 parts by weight of glass fibers having an aspect ratio of 231, 70 parts by weight of zinc powder having an average particle diameter of about 3 μm and 20 parts by weight of one kind or a combination of two kinds of the thermoplastic resins indicated in Table 14 below, which also shows the results of the evaluation of the molding composition. When two kinds of the thermoplastic resins were used, they were taken in equal amounts.

TABLE 13

| | Particulate filler | | Izod impact strength, kg · cm/cm | Warping distortion | Moldability | Density, g/cm$^3$ |
|---|---|---|---|---|---|---|
| | Kind | Average particle diameter, μm | | | | |
| Example | | | | | | |
| 184 | Zinc | 0.5 | 105 | A | A | 3.21 |
| 185 | | 10 | 82 | A | A | 3.21 |
| 186 | Zinc oxide | 0.5 | 113 | A | A | 2.86 |

TABLE 13-continued

| | Particulate filler | | Izod impact strength, kg·cm/cm | Warping distortion | Moldability | Density, g/cm³ |
|---|---|---|---|---|---|---|
| | Kind | Average particle diameter, μm | | | | |
| 187 | | 3 | 97 | A | A | 2.86 |
| 188 | | 10 | 76 | A | A | 2.86 |
| 189 | Iron | 0.7 | 101 | A | A | 3.32 |
| 190 | | 3 | 89 | A | A | 3.32 |
| 191 | | 10 | 80 | A | A | 3.32 |
| 192 | Ferrite | 0.5 | 100 | A | A | 2.86 |
| 193 | | 3 | 89 | A | A | 2.86 |
| 194 | | 10 | 81 | A | A | 2.86 |
| 195 | Stainless | 0.5 | 96 | A | A | 3.32 |
| 196 | steel | 3 | 84 | A | A | 3.32 |
| 197 | | 10 | 77 | A | A | 3.32 |
| 198 | Brass | 0.5 | 97 | A | A | 3.39 |
| 199 | | 3 | 84 | A | A | 3.39 |
| 200 | | 10 | 78 | A | A | 3.39 |
| 201 | Lead | 5 | 89 | A | A | 3.65 |
| 202 | Solder alloy | 5 | 92 | A | A | 3.37 |
| 203 | Copper | 5 | 86 | A | A | 3.45 |
| 204 | Nickel | 5 | 86 | A | A | 3.44 |
| Comparative Example | | | | | | |
| 40 | Zinc oxide | 0.1 | 113 | A | C | 2.94 |
| 41 | | 25 | 60 | C | A | 2.94 |
| 42 | Iron | 0.1 | 109 | A | C | 3.32 |
| 43 | | 30 | 61 | C | A | 3.32 |
| 44 | Ferrite | 0.1 | 105 | A | C | 2.86 |
| 45 | | 30 | 62 | C | A | 2.86 |

TABLE 14

| Example No. | Resins | Tensile strength, kg/cm² | Izod impact strength, kg·cm/cm | Flexural Strength, kg/cm² | Elastic modulus by bending, × 10⁴ kg/cm² | Molding shrinkage, % MD | Molding shrinkage, % TD | Warping distortion | Moldability | Density, g/cm³ |
|---|---|---|---|---|---|---|---|---|---|---|
| 205 | 66-PA | 1590 | 80 | 2300 | 12.1 | 0.80 | 0.50 | A | A | 3.21 |
| 206 | MXDA | 1580 | 93 | 2250 | 12.9 | 0.71 | 0.42 | A | A | 3.21 |
| 207 | PBT | 1200 | 85 | 1750 | 11.1 | 0.70 | 0.41 | A | A | 3.47 |
| 208 | PET | 1620 | 90 | 1800 | 11.2 | 0.70 | 0.42 | A | A | 3.33 |
| 209 | PC | 1490 | 155 | 1910 | 10.9 | 0.75 | 0.45 | A | A | 3.31 |
| 210 | POM | 1410 | 95 | 1900 | 11.9 | 0.82 | 0.51 | A | A | 3.60 |
| 211 | ABS | 1020 | 110 | 1500 | 9.9 | 0.72 | 0.44 | A | A | 3.07 |
| 212 | PP | 690 | 65 | 850 | 5.7 | 0.89 | 0.62 | A | A | 2.80 |
| 213 | PE | 620 | 50 | 790 | 4.9 | 0.91 | 0.67 | A | A | 2.91 |
| 214 | PVC | 650 | 31 | 970 | 10.1 | 0.85 | 0.50 | A | A | 3.52 |
| 215 | PMMA | 710 | 30 | 1520 | 12.9 | 0.86 | 0.52 | A | A | 3.30 |
| 216 | PI | 1280 | 95 | 2310 | 13.9 | 0.69 | 0.39 | A | A | 3.63 |
| 217 | PSO | 1370 | 92 | 2010 | 12.1 | 0.85 | 0.55 | A | A | 3.37 |
| 218 | PPO | 1490 | 115 | 1870 | 10.2 | 0.77 | 0.46 | A | A | 3.08 |
| 219 | 6-PA/PET | 1600 | 88 | 2050 | 11.2 | 0.77 | 0.48 | A | A | 3.28 |
| 220 | 6-PA/PPO | 1510 | 97 | 2000 | 11.0 | 0.80 | 0.49 | A | A | 3.15 |
| 221 | 6-PA/PBT | 1350 | 87 | 1970 | 11.2 | 0.75 | 0.45 | A | A | 3.20 |
| 222 | PC/PET | 1590 | 111 | 1860 | 11.1 | 0.73 | 0.43 | A | A | 3.34 |
| 223 | PPS | 1510 | 87 | 2700 | 21.7 | 0.51 | 0.33 | A | A | 3.83 |

EXAMPLES 224 TO 243

The experimental procedure in each of these Examples was substantially the same as in Examples 145 to 172 except that the molding composition were each compounded from 10 parts by weight of glass fibers having an aspect ratio of 231 as a fibrous filler, a varied amount indicated in Table 15 below of a powder of zinc (Examples 224 to 233) or zinc oxide (Examples 234 to 243) each having an average particle diameter of about 3 μm as a particulate filler and a varied amount of a thermoplastic resin indicated in Table 15, which also shows the results of the evaluation of the molding compositions.

TABLE 15

| Example No. | Particulate filler, parts by weight | Resin Kind | Resin Parts by weight | Tensile strength, kg/cm² | Izod impact strength, kg·cm/cm | Flexural strength, kg/cm² | Elastic modulus by bending × 10⁴ kg/cm² | Molding shrinkage, % MD | Molding shrinkage, % TD | Warping distortion | Moldability | Density, g/cm³ |
|---|---|---|---|---|---|---|---|---|---|---|---|---|
| 224 | 85 | 6-PA | 5 | 1110 | 77 | 1750 | 13.9 | 0.70 | 0.41 | A | A | 4.99 |
| 225 | 60 | 6-PA | 30 | 1650 | 95 | 2350 | 10.3 | 0.85 | 0.53 | A | A | 3.80 |
| 226 | 85 | PBT | 5 | 850 | 67 | 1250 | 13.1 | 0.66 | 0.37 | A | A | 5.13 |

TABLE 15-continued

| Example No. | Particulate filler, parts by weight | Resin Kind | Parts by weight | Tensile strength, kg/cm² | Izod impact strength, kg·cm/cm | Flexural strength, kg/cm² | Elastic modulus by bending × 10⁴ kg/cm² | Molding shrinkage, % MD | TD | Warping distortion | Moldability | Density, g/cm³ |
|---|---|---|---|---|---|---|---|---|---|---|---|---|
| 227 | 60 | PBT | 30 | 1350 | 95 | 1900 | 9.1 | 0.75 | 0.45 | A | A | 2.85 |
| 228 | 85 | PET | 5 | 1210 | 69 | 1360 | 13.2 | 0.67 | 0.37 | A | A | 5.05 |
| 229 | 60 | PET | 30 | 1790 | 99 | 1950 | 9.2 | 0.76 | 0.45 | A | A | 2.71 |
| 230 | 85 | PPO | 5 | 1100 | 90 | 1370 | 12.2 | 0.72 | 0.44 | A | A | 4.90 |
| 231 | 60 | PPO | 30 | 1640 | 118 | 2030 | 8.2 | 0.81 | 0.52 | A | A | 3.53 |
| 232 | 85 | PC | 5 | 1090 | 110 | 1410 | 12.9 | 0.67 | 0.38 | A | A | 5.05 |
| 233 | 60 | PC | 30 | 1650 | 165 | 2060 | 8.9 | 0.79 | 0.48 | A | A | 2.71 |
| 234 | 85 | 6-PA | 5 | 1330 | 97 | 1930 | 15.4 | 0.69 | 0.40 | A | A | 4.04 |
| 235 | 60 | 6-PA | 30 | 1830 | 115 | 2550 | 11.7 | 0.83 | 0.52 | A | A | 2.40 |
| 236 | 85 | PBT | 5 | 1050 | 87 | 1440 | 14.6 | 0.66 | 0.36 | A | A | 4.13 |
| 237 | 60 | PBT | 30 | 1550 | 115 | 2090 | 10.5 | 0.74 | 0.45 | A | A | 2.60 |
| 238 | 85 | PET | 5 | 1400 | 89 | 1510 | 14.6 | 0.66 | 0.57 | A | A | 4.08 |
| 239 | 60 | PET | 30 | 1950 | 119 | 2140 | 10.6 | 0.75 | 0.43 | A | A | 2.50 |
| 240 | 85 | PPO | 5 | 1290 | 110 | 1570 | 13.6 | 0.70 | 0.42 | A | A | 3.99 |
| 241 | 60 | PPO | 30 | 1870 | 138 | 2220 | 9.7 | 0.80 | 0.51 | A | A | 2.28 |
| 242 | 85 | PC | 5 | 1290 | 130 | 1630 | 13.4 | 0.65 | 0.37 | A | A | 4.08 |
| 243 | 60 | PC | 30 | 1830 | 190 | 2230 | 10.3 | 0.77 | 0.46 | A | A | 4.08 |

EXAMPLES 244 TO 251

The experimental procedure in each of these Examples was substantially the same as in Examples 145 to 172 except that the molding resin compositions were each compounded from 10 parts by weight of glass fibers having an aspect ratio of 231, 70 parts by weight of a zinc powder having an average particle diameter of about 3 μm and 20 parts by weight of a thermoplastic resin indicated in Table 16 below without or with further admixture of 2 parts by weight of the modified polypropylene resin prepared in Preparation Example 1 as a modifier. The fibrous and particulate fillers were used after a surface treatment with 0.5 part by weight of a dimethyl silicone fluid as the water repellent agent. Table 16 below also shows the results of the evaluation of the molding compositions.

TABLE 16

| Example No. | Resin | Modifier | Izod impact strength, kg·cm/cm | Warping distortion | Moldability | Density, g/cm³ |
|---|---|---|---|---|---|---|
| 244 | 6-PA | Yes | 106 | A | A | 3.20 |
| 245 | PBT | Yes | 98 | A | A | 3.46 |
| 246 | PET | Yes | 103 | A | A | 3.31 |
| 247 | PPO | Yes | 122 | A | A | 3.06 |
| 248 | PC | Yes | 175 | A | A | 3.30 |
| 249 | 66-PA | No | 97 | A | A | 3.20 |
| 250 | 12-PA | No | 87 | A | A | 3.00 |
| 251 | PP | No | 69 | A | A | 2.80 |

EXAMPLES 252 TO 261

The experimental procedure in each of these Examples was substantially the same as in Examples 244 to 251 using the thermoplastic resin indicated in Table 17 below excepting replacement of the zinc powder with the same amount of a zinc oxide powder having an average particle diameter of about 3 μm. Table 17 also shows the results of the evaluation of the molding compositions.

TABLE 17

| Example No. | Resin | Modifier | Izod impact strength, kg·cm/cm | Warping distortion | Moldability | Density, g/cm³ |
|---|---|---|---|---|---|---|
| 252 | 6-PA | Yes | 117 | A | A | 2.86 |
| 253 | PET | Yes | 122 | A | A | 2.94 |
| 254 | PPO | Yes | 137 | A | A | 2.75 |
| 255 | PC | Yes | 200< | A | A | 2.74 |
| 256 | PET | No | 117 | A | A | 2.94 |
| 257 | PPO | No | 130 | A | A | 2.75 |
| 258 | PC | No | 200< | A | A | 2.74 |
| 259 | 66-PA | No | 119 | A | A | 2.86 |
| 260 | 12-PA | No | 98 | A | A | 2.76 |
| 261 | PP | No | 81 | A | A | 2.58 |

What is claimed is:
1. A thermoplastic polymeric molding composition which comprises:
(A) from 2 to 70 parts by weight of a thermoplastic polymer as the matrix phase;
(B) from 98 to 30 parts by weight of a metallic filler, of which the particles have a surface coated with a water repellent agent, the amount of the water repellent agent being in the range from 0.01 to 5% by weight based on the metallic filler before coating therewith;

(C) a polypropylene-based polymer which is selected from the group consisting of a low-molecular weight polypropylene containing carboxyl groups which have been introduced into the polypropylene by oxidation thereof, added in an amount in the range of from 0.1 to 2% by weight based on the total amount of the components (A) and (b); and a polypropylene modified by a monomer selected from the group consisting of unsaturated organic acids, anhydrides thereof, esters thereof and amides thereof, added in an amount in the range of 1 to 10% by weight based on the total amount of components (A) and (B); and wherein the metallic filler as the component (B) is a powder of zinc oxide.

2. A thermoplastic polymeric molding composition which comprises:

(A) from 2 to 70 parts by weight of a thermoplastic polymer as the matrix:

(B) from 98 to 30 parts by weight of a filler which is a combination of (B-1) a metallic particulate filler having an average particle diameter in the range from 0.1 to 20 μm, (B-2) a fibrous filler having an aspect ratio in the range from 50 to 2500, in a weight ratio of (B-1):(B-2) in the range from 1:1 to 30:1, the surface of the particles of the component (B-1) and the fibers of the component (B-2) being coated with a water repellent agent in an amount in the range of from 0.01 to 5% by weight based on the total amount of the components (B-1) and (B-2) before coating therewith, and (C) a polypropylene-based polymer which is selected from the group consisting of a low-molecular weight polypropylene containing carboxyl groups which have been introduced into the polypropylene by oxidation thereof, added in an amount in the range from 0.1 to 2% by weight based on the total amount of the components (A) and (B); and a polypropylene modified by a monomer selected from the group consisting of unsaturated organic acids, anhydrides thereof, esters thereof and amides thereof, added in an amount in the range from 1 to 10 % by weight based on the total amount of the components (A) and (B); and wherein the metallic particulate filler as the component (B-1) is a powder of zinc oxide.

3. A thermoplastic polymeric molding composition which comprises:

(A) from 2 to 70 parts by weight of a thermoplastic polymer as the matrix phase;

(B) from 98 to 30 parts by weight of a metallic filler, of which the particles have a surface coated with a water repellent agent, the amount of the water repellent agent being in the range from 0.01 to 5% by weight based on the metallic filler before coating therewith;

(C) a polypropylene-based polymer which is selected from the group consisting of a low-molecular weight polypropylene containing carboxyl groups which have been introduced into the polypropylene by oxidation thereof, added in an amount in the range of from 0.1 to 2% by weight based on the total amount of the components (A) and (b); and a polypropylene modified by a monomer selected from the group consisting of unsaturated organic acids, anhydrides thereof, esters thereof and amides thereof, added in an amount in the range of 1 to 10% by weight based on the total amount of components (A) and (B); and wherein the thermoplastic resin is a polyamide resin selected from the group consisting of 6-nylon, 6,6-nylon, 12-nylon, 6,10-nylon, and 6,12-nylon.

4. A thermoplastic polymeric molding composition which comprises:

(A) from 2 to 70 parts by weight of a thermoplastic polymer as the matrix phase;

(B) from 98 to 30 parts by weight of a metallic filler, of which the particles have a surface coated with a water repellent agent, the amount of the water repellent agent being in the range from 0.01 to 5% by weight based on the metallic filler before coating therewith;

(C) a polypropylene-based polymer which is selected from the group consisting of a low-molecular weight polypropylene containing carboxyl groups which have been introduced into the polypropylene of oxidation thereof, added in an amount in the range of from 0.1 to 2% by weight based on the total amount of the components (A) and (b); and a polypropylene modified by a monomer selected from the group consisting of unsaturated organic acids, anhydrides thereof, esters thereof and amides thereof, added in an amount in the range of 1 to 10% by weight based on the total amount of components (A) and (B); and wherein the thermoplastic resin is a polypropylene.

5. The thermoplastic polymeric molding composition as claimed in claim 1 wherein the low-molecular weight oxidized polypropylene as the component (C) has an average molecular weight in the range from 1500 to 2000.

6. The thermoplastic polymer molding composition as claimed in claim 5 which comprises as component (C) the low-molecular oxidized polypropylene in an amount in the range from 0.1 to 2% by weight based on the total amount of the components (A) and (B).

7. The thermoplastic polymeric molding composition as claimed in claim 1 wherein the thermoplastic polymer is selected from the group consisting of polyamide resins, polypropylenes and poly(butylene terephthalates).

8. The thermoplastic polymeric molding composition as claimed in claim 1 wherein the water repellent agent is selected from the group consisting of silane coupling agents, titanate coupling agents and silicone fluids.

9. The thermoplastic polymeric molding composition as claimed in claim 1 wherein the water repellent agent is selected from the group consisting of 3-aminopropyl triethoxy silane, N-(2-aminoethyl)-3-aminopropyl trimethoxy silane, isopropyl triisostearoyl titanate, isopropyl tri(N-aminoethyl aminoethyl) titanate, dimethyl silicone fluids and methyl hydrogen polysiloxanes.

10. The thermoplastic polymeric molding composition as claimed in claim 2 wherein the low-molecular weight oxidized polypropylene as the component (C) has an average molecular weight in the range from 1500 to 20000.

11. The thermoplastic polymer molding composition as claimed in claim 10 which comprises as component (C) the low-molecular oxidized polypropylene in an amount in the range from 0.1 to 2% by weight based on the total amount of the components (A) and (B).

12. The thermoplastic polymeric molding composition as claimed in claim 2 wherein the thermoplastic polymer is selected from the group consisting of polyamide resins, polypropylenes and poly(butylene terephthalates).

13. The thermoplastic polymeric molding composition as claimed in claim 2 wherein the fibrous filler as the component (B-2) is selected from the group consisting of glass fibers, carbon fibers, stainless steel fibers, potassium titanate whiskers and aromatic polyamide fibers.

14. The thermoplastic polymeric molding composition as claimed in claim 2 wherein the water repellent agent is selected from the group consisting of silane coupling agents, titanate coupling agents and silicone fluids.

15. The thermoplastic polymeric molding composition as claimed in claim 2 wherein the water repellent agent is selected from the group consisting of 3-aminopropyl triethoxy silane, N-(2-aminoethyl)-3-aminopropyl trimethoxy silane, isopropyl triisostearoyl titanate, isopropyl tri(N-aminoethyl aminoethyl) titanate, dimethyl silicone fluids and methyl hydrogen polysiloxanes.

16. The thermoplastic polymeric molding composition as claimed in claim 3 wherein the low-molecular weight oxidized polypropylene as the component (C) has an average molecular weight in the range from 1500 to 20000.

17. The thermoplastic polymer molding composition as claimed in claim 16 which comprises as component (C) the low-molecular oxidized polypropylene in an amount in the range from 0.1 to 2% by weight based on the total amount of the components (A) and (B).

18. The thermoplastic polymeric molding composition as claimed in claim 3 wherein the metallic filler as the component (B) is a powder of metallic zinc.

19. The thermoplastic polymeric molding composition as claimed in claim 3 wherein the water repellent agent is selected from the group consisting of silane coupling agents, titanate coupling agents and silicone fluids.

20. The thermoplastic polymeric molding composition as claimed in claim 3 wherein the water repellent agent is selected from the group consisting of 3-aminopropyl triethoxy silane, N-(2-aminoethyl)-3-aminopropyl trimethoxy silane, isopropyl triisostearoyl titanate, isopropyl tri(N-aminoethyl aminoethyl) titanate, dimethyl silicone fluids and methyl hydrogen polysiloxanes.

21. The thermoplastic polymeric molding composition as claimed in claim 4 wherein the low-molecular weight oxidized polypropylene as the component (C) has an average molecular weight in the range from 1500 to 20000.

22. The thermoplastic polymer molding composition as claimed in claim 21 which comprises as component (C) the low-molecular oxidized polypropylene in an amount in the range from 0.1 to 2% by weight based on the total amount of the components (A) and (B).

23. The thermoplastic polymeric molding composition as claimed in claim 4 wherein the metallic filler as the component (B) is a powder of metallic zinc.

24. The thermoplastic polymeric molding composition as claimed in claim 4 wherein the water repellent agent is selected from the group consisting of silane coupling agents, titanate coupling agents and silicone fluids.

25. The thermoplastic polymeric molding composition as claimed in claim 4 wherein the water repellent agent is selected from the group consisting of 3-aminopropyl triethoxy silane, N-(2-aminoethyl)-3-aminopropyl trimethoxy silane, isopropyl triisostearoyl titanate, isopropyl tri(N-aminoethyl aminoethyl) titanate, dimethyl silicone fluids and methyl hydrogen polysiloxanes.

* * * * *